United States Patent
Ruff

(10) Patent No.: US 10,079,532 B2
(45) Date of Patent: Sep. 18, 2018

(54) INDUCTION GENERATOR AND METHOD FOR GENERATING AN ELECTRIC CURRENT USING AN INDUCTION GENERATOR

(71) Applicant: ZF Friedrichshafen AG, Friedrichshafen (DE)

(72) Inventor: Eduard Ruff, Auerbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 542 days.

(21) Appl. No.: 14/441,767

(22) PCT Filed: Nov. 5, 2013

(86) PCT No.: PCT/EP2013/072985
§ 371 (c)(1),
(2) Date: May 8, 2015

(87) PCT Pub. No.: WO2014/072267
PCT Pub. Date: May 15, 2014

(65) Prior Publication Data
US 2015/0295484 A1 Oct. 15, 2015

(30) Foreign Application Priority Data
Nov. 9, 2012 (DE) .................. 10 2012 220 418

(51) Int. Cl.
*H02K 41/02* (2006.01)
*H02K 35/04* (2006.01)
*H02K 7/18* (2006.01)

(52) U.S. Cl.
CPC ........... *H02K 35/04* (2013.01); *H02K 7/1892* (2013.01); *H01H 2239/076* (2013.01)

(58) Field of Classification Search
CPC ....... H02K 35/04; H02K 35/00; H02K 7/1982
(Continued)

(56) References Cited

U.S. PATENT DOCUMENTS 3,067,404 A 12/1962 Hildebrandt
5,434,549 A * 7/1995 Hirabayashi ........... H02K 33/00
335/229

(Continued)

FOREIGN PATENT DOCUMENTS

CN 101 353 981 A 1/2009
CN 101 764 495 A 6/2010
(Continued)

OTHER PUBLICATIONS

International Search Report dated Mar. 6, 2015 in International Application No. PCT/EP2013/072985 (German language).
(Continued)

*Primary Examiner* — Hanh Nguyen
(74) *Attorney, Agent, or Firm* — Brinks Gilson & Lione

(57) ABSTRACT

An induction generator (200; 301) having a magnet assembly (204; 304) for generating a permanent magnetic field, an annular coil (206; 306), a spring element (228; 328) and an air channel (212; 312) through which the permanent magnetic field passes, is proposed, wherein the magnet assembly (204; 304) comprises a first pole section (208; 308) and a second pole section (210; 310) and a magnet (214; 314) disposed between the first pole section (208; 308) and the second pole section (210; 310), the coil (206; 306) is connected to the spring element (228; 328) and is movably disposed in the air channel (212; 312) and the spring element (228; 328) is designed to cause an oscillation movement (224) of the coil (206; 306) in the air channel (212; 312) transverse to a magnetic flux (222; 322) of the permanent magnetic field inside the air channel (212; 312) in response to a deflection of the coil (206; 306), characterized in that the air channel (212; 312) is annular and is designed to accommodate the annular coil (206; 306) in its entire circumference.

16 Claims, 11 Drawing Sheets

(58) Field of Classification Search
USPC .......................................... 310/15, 36, 12.12
See application file for complete search history.

(56) References Cited

U.S. PATENT DOCUMENTS

| | | | |
|---|---|---|---|
| 5,693,990 A | 12/1997 | Miyazaki | |
| 7,569,952 B1* | 8/2009 | Bono | H02K 35/02 |
| | | | 310/15 |
| 2003/0016089 A1 | 1/2003 | Cousy et al. | |
| 2007/0108850 A1* | 5/2007 | Chertok | H02K 1/145 |
| | | | 310/15 |
| 2013/0188341 A1* | 7/2013 | Tseng | H02K 35/04 |
| | | | 362/183 |
| 2014/0117785 A1* | 5/2014 | Furukawa | H02K 35/00 |
| | | | 310/15 |

FOREIGN PATENT DOCUMENTS

| | | |
|---|---|---|
| DE | 101 12 072 A1 | 9/2001 |
| DE | 10 2010 020 668 A1 | 7/2011 |
| JP | H11-32470 A | 2/1999 |

OTHER PUBLICATIONS

German Office Action dated Jul. 22, 2013 in corresponding German Application No. 10 2012 220 418.0 (German language).

\* cited by examiner

INDUCTION GENERATOR AND METHOD FOR GENERATING AN ELECTRIC CURRENT USING AN INDUCTION GENERATOR

This application is a filing under 35 U.S.C. § 371 of International Patent Application PCT/EP2013/072985, filed Nov. 5, 2013, and claims the priority of German Patent Application DE 10 2012 220 418.0, filed Nov. 9, 2012, both of which are incorporated by reference herein in their entirety.

The present invention relates to an induction generator and a method for generating an electrical current using an induction generator.

Already known electromagnetic energy converters, used for example with remote switches, basically always use the same principle. Through a movement of a magnet system having a permanent magnet, or a movement of a magnetic core itself, an abrupt change in the magnetic flux is caused in a magnetic circuit, by means of which electrical energy is generated by means of induction in a static coil placed on the magnetic core. Normally, the systems use a complete magnetic pole reversal in the magnetic circuit during a switching operation.

DE 101 12 072 A1 discloses a switching element with an actuator, which is functionally connected via a lever assembly to an energy converter for the switching element, such that the movement of the actuator can be transferred to the energy converter. As a result, the energy converter converts at least a portion of the mechanical energy expended for actuating the actuator into electrical energy.

Based on this, an improved induction generator and an improved method for generating an electrical current according to the main Claims is proposed. Advantageous designs can be derived from the dependent Claims and the following description.

With an induction generator, the electrical energy is calculated from the following equations:

$$E_e = E_m - E_v$$

$$E_v = E_{vm} + E_{vmg} + E_{ve}$$

Where:
$E_e$=electrical energy
$E_m$=mechanical energy
$E_v$=energy loss
$E_{vm}$=mechanical energy loss
$E_{vmg}$=magnetic energy loss
$E_{ve}$=electrical energy loss Aside from the fact that a performance of an induction generator can be significantly improved when the coil of the generator is moved for converting energy, instead of the substantially heavier magnet system, the knowledge that the efficiency of an induction generator can be improved even more when a largest possible portion of the winding circumference of the coil is exposed to a magnetic field for generating current is of particular significance. By way of example, the entirety, nearly the entirety, more than three quarters, or more than two thirds, of the winding circumference of the coil is exposed to a magnetic field. By this means, specifically, an effective reduction of resistance losses in the winding region, and thus a better energy yield, can be obtained. With the concept presented herein, both approaches, i.e. the movement of the coil instead of the magnet system, as well as the passing of the magnetic field through the coil to the fullest possible extent, can be implemented in combination, and a particularly powerful induction generator can be created.

An induction generator conceived according to embodiments of the invention presented here is particularly suitable, for example, for use in devices having a flat construction, e.g., remote switches, like light switches or similar installation switches, in which the direction of actuation is to be oriented perpendicular to the structure. An additional mechanical deflection of the force application is not necessary with the concept presented herein. By this means, a further increase in efficiency can be obtained.

For the kinetic energy, or motion energy, the following equations apply:

$$E_{kin.} = 0.5 \times m \times v^2$$

Where:
$E_{kin.}$=kinetic energy
m=mass
v=speed

The electrical energy of a generator is calculated as follows:

$$E_{el.} = U^2 \times t / R$$

Where:
$E_{el.}$=electrical energy
U=voltage
t=time
R=electrical resistance
v≈U

Thus, it is more logical to invest in increasing speed or voltage rather than in increasing mass or time, in particular when taking into account the fact that a magnetostatic increase in the flux density in the iron circuit is only possible to a certain extent, due to the laws of nature, because even the best soft magnetic materials can only provide a maximum flux density of ca. 2.4 T. As a matter of course, it is worthwhile to maintain the flux density, or the magnetic field, respectively, at a level that is as high as possible; for economical reasons, the flux density can be selected, for example, in the range of 1.8-2.0 T (Fe, FeSi). A reduction of the coil resistance can also provide a positive contribution to the production of energy.

In accordance with embodiments of the present invention, the efficiency in electromagnetic energy converters can be decidedly improved, in that a relatively heavy element of the iron circuit, the magnet, or magnet core, does not have to be accelerated as quickly as possible in a short path, and stopped at the end of the cycle as quickly as possible. With the concept presented here, the majority of the energy, which otherwise is uselessly eliminated in an impact, can now be converted. In addition, the noise emission can be reduced, and the service life of the generator can be increased. The high efficiency of an induction generator presented herein is due, in particular, to the fact that the force for the acceleration of the relatively heavy movable magnet system is no longer needed. As a side effect, mechanical losses in the linear support for the moving part as well as the danger, involving the relatively low natural frequency, that the system, in a practice related vibration spectrum, becomes caught up in an undesired resonance oscillation and generates energy, which could lead to the generation of undesired remote signals in a remote switch.

In accordance with the approach presented here, it is no longer necessary to reverse the polarity of a magnet or coil core interacting with an induction generator. No, or very small, magnetic losses must be accounted for. An induction generator designed according to embodiments of this invention does not need a gearing, which decreases the efficiency, and does not have a complex structure prone to mechanical problems.

An induction generator designed according to the concept presented here can combine all of the criteria that make for an optimal electromagnetic energy converter, for self-sufficient remote signal systems, for example. These include a smaller structural space, a high energy density, a high efficiency, a short activation path, a low activation force, a low noise emission, a nearly constant energy quantity, a functionality independent of the actuation speed, robustness with respect to temperature changes, mechanical robustness, as well as low manufacturing costs.

The described approach accommodates the increasing need for self-sufficient remote signal systems that are capable of implementing complex remote protocols such as KNX-RF, ZigBe, Bluetooth Low Energy, or W-LAN with high transmission power and numerous repetitions. This is only possible with extremely powerful generators (0.7 to 2 mWs). A simple enlargement of known energy converters is not productive thereby, because the operability of such systems is not possible, or is strongly impeded, because of the further increasing actuation forces and dimensions, as well as the increased noise emission.

An induction generator, having a magnet assembly for generating a permanent magnetic field, an annular coil, a spring element, and an air channel through which the permanent magnetic field passes, wherein the magnet assembly comprises a first pole section, a second pole section, and a magnet disposed between the first pole section and the second pole section, the coil is connected to the spring element and is movably disposed in the air channel, and the spring element is designed to cause an oscillation movement of the coil in the air channel, transverse to a magnetic flux of the permanent magnetic field inside the air channel, in response to a deflection of the coil, is characterized in that the air channel has an annular shape, and is designed to accommodate the annular coil over its entire circumference.

The induction generator, or electrical generator, concerns a device that is designed to generate electrical current or electrical voltage by means of electromagnetic induction. An induction generator of this type can, for example, be used in combination with a self-sufficient remote switch, used, for example, for switching a lighting system on and off. The components of the magnet assembly can, for example, exhibit iron, cobalt, nickel, or ferrite, or an alloy of a plurality of these metals, and can be designed for forming a static magnetic field, the permanent magnetic field. The magnet assembly can be designed as an integrated unit, such that the first pole section, the second pole section, and the magnet lying therebetween can form individual regions of the magnet assembly that are not outwardly distinguishable. The transitions between the regions can be smooth thereby, wherein the first or second pole section can form the north pole, and the respective other section can form the south pole of the magnet assembly. In each case, one half of the magnet can be allocated to the north pole region, and one half can be allocated to the south pole region of the magnet assembly.

Alternatively, the magnet assembly can be formed as a multi-part assembly. In accordance with this embodiment, the magnet can be designed as a discrete permanent magnet, having a north pole and south pole. The first and second pole sections can be formed, for example, by one pole shoe in each case, wherein one of the pole shoes is disposed adjacent to the south pole of the magnet, and the other pole shoe can be disposed adjacent to the north pole of the magnet. The pole shoes can be produced from a material having a high permeability, e.g., iron. They can be magnetized by the polarity of the respective adjacent pole of the magnet, and allow the magnetic field lines of the magnet to be emitted in a defined form. In particular, the first and the second pole sections can exhibit different sizes and shapes.

Furthermore, the annular shape of the air channel can be circular or angular, e.g. rectangular, triangular, or polygonal. The air channel can have a floor and an inner wall, and an outer wall lying opposite the inner wall. The floor of the air channel can run parallel to a base surface of the induction generator formed by the first pole section. The air channel can be open at the top, or can be covered by a channel cover. A cross-section of the air channel can be constant throughout. The magnetic flux of the permanent magnetic field can—depending on the polarity of the magnet—run from the inner wall of the air channel to the outer wall, or vice versa, from the outer wall of the air channel to the inner wall.

The annular coil can be a winding of one or more electrical conductors, e.g. copper wires. In particular, a characteristic of the annular shape of the coil—adapted to one dimension of the air channel—can correspond to the annular shape of the air channel, such that the coil can be disposed therein, preferably uniformly spaced apart from the walls and floor of the air channel. The annular coil can be connected to the spring element, so that it is supported in the air channel such that it can be deflected in a direction perpendicular to its winding plane. The deflection of the annular coil can occur by a deflection means in the induction generator, in order to initiate the oscillation movement of the coil enabled by the spring element. The oscillation movement can be a damped oscillation, the strength of which becomes weaker and finally dies off over time, dependent on a specific construction and/or a specific spring force of the spring element. An electrical current flow can be generated in the conductors forming the coil via the oscillation of the coil occurring transverse to the magnetic flux of the permanent magnetic field. In particular, the annular coil can be designed without a core. In other words, the winding of the coil can be carried out on a coil winding support, wherein the coil winding support is designed such that a durable, or stable winding for forming the annular coil is possible. The coil winding support can preferably be formed by a frame element, which for its part, can be formed by a single part or multiple parts. In this manner, the coil can be designed with a very low weight. As a result, there is the advantage that an oscillation can be very quickly initiated in the coil when it is in a stationary state, with very little resistance, and the oscillation itself can exhibit a very high frequency. By this means, the efficiency of the induction generator can be improved. One or more spring elements can be implemented, which support the coil and enable the oscillation movement of the coil. The spring element can comprise one or more suitable springs, e.g. a flexible spring, tension spring, or compression spring. The spring element can be designed to support the coil, and to enable the oscillation movement of the coil.

According to one embodiment of the induction generator, the air channel can be bordered by at least two opposing wall regions, wherein one of the wall regions can be formed by a wall section of the first pole section, and the other wall region can be formed by a lateral surface of the second pole section. For this, the first pole section, the magnet, and the second pole section can be disposed in relation to one another to form a stack, wherein the first pole section can preferably also form a floor or base element of the induction generator. Depending on the preferred design of the magnet assembly, either the wall section of the first pole section can form an inner wall of the air channel and the wall section of the second pole section can form an outer wall of the air channel, or vice versa, the wall section of the first pole section can form an outer wall of the air channel, and the wall section of the second pole section can form an inner wall of the air channel.

By way of example, the first pole section can form a pot for receiving the magnet and the second pole section, wherein the wall section of the first pole section is formed by the encompassing outer boundary area of the pot-shaped first pole section. In order to form the pot, the encompassing outer boundary area of the first pole section can be folded over in the shape of a brim, such that the folded over region runs perpendicular to the rest of the pole section, wherein the wall section facing toward the middle of the induction generator, or the wall section facing radially inward, forms an outer wall of the air channel. Accordingly, the lateral surface of the second pole section disposed inside the pot forms an inner wall of the air channel running parallel to the outer wall. The lateral surface faces radially outward thereby. This embodiment has the advantage that the magnet is well protected with respect to an exterior of the induction generator.

Alternatively, the magnet assembly can have an annular design, wherein the first pole section forms a hub-like annular accommodation for accommodating the magnet and the second pole section. The wall section of the first pole section is formed thereby by a cylindrical central region of the first pole section. The folded over region can, in turn, run perpendicular to the rest of the first pole section, wherein the folded over region, or the wall section forms, however, an inner wall of the air channel here. The rest forms a bearing surface for accommodating the annular magnet and the annular second pole section. Accordingly, an inner surface of the annular second pole section, placed on the cylindrical center section, can form an outer wall of the air channel. By way of example, the magnet assembly can be designed as a circular ring. When an annular magnet is used, the induction generator can be manufactured particularly inexpensively, because inexpensive materials can be used for this.

In particular, the cylindrical central region of the first pole section, starting from the remaining region bordering the central region, can exhibit a height corresponding to the material thickness of the magnet and the second pole section. In other words, the magnet assembly can be such that the free outer surfaces of the first and second pole sections, facing in the same direction, lie in a common plane, by means of which a planar, or flat, bearing surface can be created having a maximum bearing surface or contact surface. Moreover, the two pole sections can thus form a conveniently formed housing, for protecting the coil and the magnet assembly.

A winding of the annular coil can run along the air channel. Thus, a conductor of the coil can run parallel, or nearly parallel, to the floor of the air channel. Thus, in a simple manner, it can be ensured that the conductor is always disposed transverse to the magnetic flux of the permanent magnetic field, and electrical voltage can be induced therein.

The spring element can furthermore be designed to cause the oscillation movement of the coil along a central axis of the coil. The winding of the coil runs about the central axis of the coil, so that the central axis can be oriented such that it is orthogonal to a winding plane of the coil encompassing the winding. Accordingly, the annular coil can run parallel, or nearly parallel, to walls of the air channel and, at a right angle to the magnetic flux, can dip deeper into the air channel and bounce back up, in an alternating manner, without exiting the magnetic flux of the permanent magnetic field at any time during the oscillation. By this means, a maximum voltage can be induced in the winding of the coil in a simple manner, by the oscillation movement.

In particular, the permanent magnetic field can form a torus-shaped magnetic field circuit, the magnetic flux of which crosses the air channel between the first pole section and the second pole section. As a result, the magnetic field can pass through the entire circumference of the coil.

According to an alternative embodiment of the induction generator, the air channel can be bordered by at least two opposing wall regions, wherein one of the wall regions can be formed by a wall section of the magnet assembly, and the other wall section can be formed by a wall section of a magnetic flux conductor disposed opposite the magnet assembly. For this, the first pole section, the magnet, and the second pole section can be disposed on top of each other, forming a stack, wherein a lateral surface of this stack assembly can form the wall section of the magnet assembly. The magnetic flux conductor can be a component of the induction generator, and can have, e.g., iron, cobalt, nickel or ferrite, or an alloy of a plurality of these metals, and can be designed to conduct a portion of the permanent magnetic field generated by the magnet assembly from one pole section to the other pole section. Depending on which design of the induction generator is preferred, either the wall section of the magnet assembly can form an inner wall of the air channel and the wall section of the magnetic flux conductor can form an outer wall of the air channel, or vice versa, the wall section of the magnet assembly can form an outer wall of the air channel and the wall section of the magnetic flux conductor can form an inner wall of the air channel. The first design is preferred over the second, in particular, due to the possibility of a more compact design.

For the present invention, starting from a center, or a middle of the induction generator, in a radial direction thereof, a section lying close to the middle is to be understood as the inner region, and a region spaced radially further away from the middle is to be understood as the outer region.

In particular, the magnetic flux conductor can have a dimension along a direction running parallel to the stacking axis of the stack assembly that corresponds to the material thickness of the magnet, the first pole section and the second pole section. Thus, the first and second pole sections can each be disposed opposite an end region of the magnetic flux conductor, wherein the portion of the permanent magnetic field conducted by the magnetic flux conductor can be received by one of the two end regions, depending on the polarity of the magnet, conducted via an intermediate region lying therebetween to the other of the two end regions, and can then be discharged at the other end region.

Preferably, the magnet assembly and the magnetic flux conductor have an annular design. By way of example, the magnet assembly and the magnetic flux conductor can be designed as a circular ring. When an annular magnet and an annular magnetic flux conductor are used, the induction generator can be manufactured particularly inexpensively, because inexpensive materials can be used.

It is furthermore preferred that the annular coil have two windings running in opposite directions, spaced apart from one another, made of at least one winding body, such as a winding wire, wherein one of the windings can move in an oscillating manner transverse to a magnetic flux of the permanent magnetic field between one of the two pole sections and the magnetic flux conductor, and the other winding can move in an oscillating manner transverse to a magnetic flux of the permanent magnetic field between the other of the two pole sections and the magnetic flux conductor. Preferably, the two windings are disposed on a common coil carrier, which has a winding region for each of the two windings, wherein the two winding regions are connected to one another via at least one winding body reverser. The respective winding region is preferably formed by a winding channel, wherein the winding body reverser is formed by an intermediate channel connecting the winding channels. The intermediate channel forms a bearing surface section thereby, pointing in the encircling direction of the coil carrier, on which the winding body can be placed in order to reverse the winding from one winding direction to the other, opposite, winding direction. The annular coil can thus have a right-hand winding and a left-hand winding, which are functionally connected to one another, and, as is furthermore preferred, are formed by one winding body. As a result, the opposing magnetic fluxes of the permanent magnetic field, between the magnet assembly and the magnetic flux conductor, can simultaneously be used for generating the induction voltage, by means of which the efficiency is increased.

According to one embodiment of the induction generator, it has a supporting structure for housing the magnet assembly and the spring element, wherein one end of the spring elements can be retained in a stationary manner by means of the supporting structure. The connection of the magnet assembly to the supporting structure can be direct or indirect—e.g., via the first pole section. The supporting structure can be an element of the induction generator, by means of which, on one hand, the induction generator can be fixed in a housing, and on the other hand, by means of which the electrical current generated by the induction generator can be discharged. The supporting structure can, for example, be manufactured from a plastic, and can be designed to engage in a lateral region of the coil/magnet system assembly. The coil can be supported by the spring element such that it can move in relation to the supporting structure, and thus in relation to the permanent magnetic field. This embodiment has the advantage that, in particular, the relatively heavy magnet can be used statically for generating current, by means of which the noise emission can be minimized, and the service life of the induction generator can be extended. Likewise, the structural size of the induction generator can be smaller, because a housing or supporting structure does not need to withstand any loads caused by an acceleration of the heavy magnet.

Alternatively, the supporting structure can be equipped to at least support the spring element and the magnetic flux conductor, wherein one end of the spring element can be retained in a stationary manner by means of the supporting structure. It is furthermore preferred that the supporting structure can be designed in an annular shape, wherein the annular coil/magnet system assembly can be accommodated in the central region of the supporting structure, and the annular coil can be retained by the end of the spring element such that it can be deflected, or caused to oscillate. The coil can thus be supported by the spring element such that it can move in relation to the supporting structure and thus in relation to the permanent magnetic field. The annular magnetic flux conductor can be supported thereby, such that it is clamped by the supporting structure. This can occur, for example, by means of a press fit of the magnetic flux conductor in the central region of the supporting structure.

Alternatively, or in addition thereto, the magnetic flux conductor can be supported by the supporting structure via one or more supporting elements, such as supporting lugs, for example. Furthermore, alternatively, the supporting structure itself can form the magnetic flux conductor in a region lying opposite the coil. The supporting structure can be manufactured from a plastic, for example, wherein the section of the supporting structure forming the magnetic flux conductor contains an element that conducts a magnetic flux of a permanent magnetic field. The section of the supporting structure forming the magnetic flux conductor can be formed entirely of the magnetic flux conducting elements, and can be connected to the rest of the plastic structure of the supporting structure. Alternatively, the section of the supporting structure forming the magnetic flux conductor can be made of plastic, in which the magnetic flux conducting elements are embedded or integrated, or onto which these elements are applied. This embodiment also has the aforementioned advantages.

Preferably the annular supporting structure has a first supporting ring in the radial direction for supporting the magnetic flux conductor, and a second supporting ring, radially bordering the first on the outside, which supports the end of the spring element, wherein the first supporting ring is thinner than the second supporting ring along a central axis of the supporting structure that is orthogonal to the radial direction thereof. As a result, on one hand the magnetic flux conductor can be tightly disposed on the coil, and, on the other hand a greater range of movement can be provided for the spring element, running in the radial direction.

It is furthermore preferred that the second supporting ring has an interrupted ring segment, which radially exposes the first supporting ring. As a result, an actuation region can be provided, into which an actuating element can extend, for deflecting the coil, starting from the central region of the supporting structure.

It is furthermore preferred that the second supporting ring has a break running, in a ring segment, along the central axis that is orthogonal to the radial direction, which extends from one surface to the other surface of the supporting structure. As a result, a connection can be created between the surfaces, through which an electrical contact for the coil/magnet system assembly can pass, in order to establish electrical contact thereto, from just one surface.

Preferably the supporting structure has, in the radial direction, a cover ring, radially bordering the second supporting ring on the outside, which is wider than the second supporting ring along the central axis that is orthogonal to the radial direction thereof. As a result, a surface bordering the spring element and a housing for protecting the coil/magnet system assembly can be created.

It is furthermore preferred that the supporting structure is symmetrical in relation a central plane of the supporting structure running in the radial direction. The supporting structure can be more simply manipulated as a result, because the two surfaces lying opposite one another, facing toward the central axis of the supporting structure, can be used, respectively, as the upper or lower surface of the induction generator.

Preferably the supporting structure has a supporting element for housing the magnet assembly, wherein the supporting element extends radially from the second supporting ring or the cover ring to at least the central region of the supporting structure. It is furthermore preferred that the supporting element is formed as an integral part of the supporting structure, by means of an injection molding process, for example. Alternatively, the supporting element can be attached to the supporting structure, or also alternatively, can lie against the supporting structure. Preferably, the supporting element forms a floor for the supporting structure, in which the coil/magnet system assembly can be accommodated, and the in which the first supporting ring is disposed. As a result, protection for the coil/magnet system assembly can be ensured. Alternatively, the supporting element can also be disposed such that it covers the second supporting ring or the cover ring. As a result, a simpler support of the supporting structure on the supporting element can be obtained.

Preferably the supporting structure has at least one contact element for establishing electrical contact to the coil/magnet system assembly that can be accommodated in the supporting structure, wherein the contact element can be coupled to a load. Any device that uses energy generated by the coil/magnet system assembly is regarded as a load. It is furthermore preferred that the contact element forms a cover element for the supporting structure, wherein the cover element is designed to cover the central region of the supporting structure and the first supporting ring. Alternatively, the cover element can be designed to cover the second supporting ring or the cover ring. Furthermore, alternatively the contact element can preferably form a supporting element, as described above, or can be used together with such a supporting element. The latter option enables an encapsulation of the coil/magnet system assembly in the supporting structure, by means of which an improved protection can be obtained.

Preferably the coil has a coil carrier, which is connected to a free end of the spring element lying opposite the retained end of the spring element. The coil carrier can be preferably connected directly, or alternatively, via at least one further element, to the free end of the spring element. By this means, a spring force of the spring element can be transferred to the coil with very little loss in force, and in a uniform manner, via the coil carrier. At the same time, this embodiment enables a simple implementation of a transference of the electrical current generated in the coil to the spring element, by means of current output, for example, via a contact integrated in the spring element.

It is furthermore preferred that the coil carrier comprises an actuating element for deflecting the coil. The actuating element can, for example, be designed in the form of an actuating tongue, and can be disposed such that it can be readily accessed by an actuator, and the coil can be deflected from its stationary position in one of two opposing directions. After the actuating element has been released, the oscillating movement of the coil can begin.

According to one embodiment of the induction generator, the spring element can have a first double flat spring and a second double flat spring, between which the coil is supported in the air channel such that it can oscillate. The two double flat springs can be identical. The double flat spring can be two flat flexible springs connected to one another, disposed above one another such that they are orthogonal to the winding plane of the coil. A spacing between the individual flat flexible springs can basically correspond to the height of the coil. In this configuration, the double flat springs can form a double parallelogram, in which the springs disposed above one another can deform in two opposing directions, orthogonal to the winding plane. Using this double parallelogram formed in this manner, the coil can be caused to oscillate in a particularly uniform and prolonged manner. An efficiency of the induction generator can be maximized thereby.

Furthermore, the spring element can form an electrical conductor for establishing contact with the coil. For this, one section of the spring element can comprise a contact element for obtaining current from an alternating current provided as a result of the oscillation movement by the coil. Thus, the spring element can be implemented for conducting the electrical current induced in the coil, between the coil and an electrical load, for example. Advantageously, the spring element can have two sections that are electrically insulated from one another, by means of which contact is established to the coil, and the induction generator can be supported such that it can move in relation to the supporting structure. By way of example, electrical contacts of the coil can be subjected to electrical contact via two double flat springs, wherein the double flat springs are electrically insulated from one another. Structural space can be saved with this embodiment, because there is no need for a separate current collector.

With a preferred use of double flat springs, disposed on both sides of the coil, as the spring element, as well as the coil carrier, this spring element can have two appendages, with which, in each case, one end of a double flat spring can engage in order to retain the coil carrier.

Although the supporting of the coil by means of the double parallelogram is preferred, it is not, however, necessary. The coil can, for example, also be supported by means of a simple leaf spring or diaphragm, such that it can oscillate. A simple linear support, with a combination of flexible, tension or compression springs, is also possible. For current collection, the double flat springs, flexible films, sliding contacts, or wires can be used.

According to an alternative embodiment of the induction generator, the spring element can have a first flat flexible spring and a second flat flexible spring, between which the coil can be supported in the air channel such that it oscillates. The two flat flexible springs can be identical. The flat flexible spring can be manufactured from a basic form for a leaf spring. By way of example, a predetermined shape of the flat flexible spring can be obtained from the basic form of the leaf spring by means of die cutting. The flat flexible spring preferably has a retainable end and a free end lying opposite the retainable end, for retaining the coil, in particular the coil carrier. The retainable end is designed to be retained by the supporting structure. Preferably the retainable end is designed to be able to lie against the supporting structure. The free end is designed to oscillate freely in relation to the retainable end, according to the effect of a force that induces oscillation. Preferably, the free end is connected to the retainable end via a spring arm in the shape of a circle segment. Preferably the flat flexible spring is circular. It is furthermore preferred that the retainable end is formed by a flat flexible spring edge having the shape of at least a semicircle, from the end regions of which the circular spring arms extend, respectively, toward a center of the semicircular shape of the flat flexible spring edge, to a retaining region disposed in the region of the center of the semicircular shape, wherein the retaining region forms the free end of the flat flexible spring, and is designed for retaining the coil or the coil carrier. It is furthermore preferred that the retaining region is formed by a circular central section of the flat flexible spring. The central section is preferably formed such that it can be attached to a cylindrical coil carrier. The central section is furthermore preferably connected at opposing locations to the spring arms shaped as circle segments.

It is furthermore preferred that the flat flexible spring has an actuating element for deflecting the coil. The actuating element can be designed, for example, in the form of a tongue, and can be disposed such that it can be readily accessed by an actuator, and the coil can be deflected from its stationary position in one of two opposing directions. After the actuating element has been released, the oscillation movement of the coil can begin. It is furthermore preferred that the actuating tongue is disposed at a transition of the circle segment-shaped spring arm to the circular central section of the flat flexible spring, and extends away from the central section.

A spacing between the individual flat flexible springs can preferably correspond to approximately the height of the coil or the coil carrier, respectively, wherein the flat flexible springs are disposed parallel to one another. In this configuration, the spring arms of the respective flat flexible springs can deform at an angle to the winding plane, in order to cause an oscillation movement of the coil. The coil can be caused to oscillate, in a particularly uniform and prolonged manner, in a direction orthogonal to the winding plane, by means of the force application points of the two spring arms, lying opposite one another, at the central section. An efficiency of the induction generator can be maximized thereby.

Preferably each of the flat flexible springs can form an electrical conductor for establishing electrical contact with the coil. For this, a section of the flat flexible spring can comprise a contact element for current collection of an alternating current provided as a result of the oscillation movement of the coil. Preferably the contact element is disposed on the flat flexible spring edge. It is furthermore preferred that the contact element extends from a plane of the flat flexible spring comprising the basic form. It is furthermore preferred that the contact element is formed as a sliding contact on the free end. It is furthermore preferred that the sliding contacts are disposed on the free ends of each of the first and second flat flexible springs, in a common plane. As a result, the flat flexible springs can be implemented in a simple and efficient manner for conducting the electrical current induced in the coil, between the coil and an electrical load, for example. Furthermore, the electrical contact with the coil need only occur from one side of the supporting structure, or coil, respectively.

According to one embodiment of the induction generator, it has a cylindrical coil carrier, onto which the preferred flat flexible springs can be attached. The coil carrier has one or more retaining projections on at least one end surface thereof, which protrude radially from the body of the cylinder, and are designed to rest against the retaining region of the flat flexible springs. It is furthermore preferred that the coil carrier has an internal thread in the regions of the end surfaces, which is designed such that a retaining element provided with an external thread can be screwed into it at the end surfaces of the coil carrier. The retaining element is preferably cylindrical for this purpose, designed with an external thread, and furthermore, preferably has one or more retaining projections on an end lying opposite the start of the external thread, which protrude radially from the cylindrical body of the retaining element, and are designed to rest against the retaining region of the flat flexible spring. The flat flexible spring can be retained, or can be attached in a clamping manner, to the end surface of the coil carrier by means of the retaining element that can be screwed into the coil carrier, between the retaining projections of the retaining element and the coil carrier. It is furthermore preferred that the coil carrier has an internal thread on each of the end surfaces, for attaching a retaining element as described above.

The induction generator can have a detection device, for detecting an initial polarity of an alternating voltage provided as a result of the oscillation movement of the coil. The initial polarity is dependent on an initial direction of the oscillation movement resulting from the deflection, and is thus dependent on a direction of the deflection of the coil. Accordingly, the detection device can be designed to detect an initial direction of an alternating current provided as a result of the oscillation movement of the coil. As a result, it is possible to determine, for example, which of the two opposing directions the coil is deflected in by means of the actuating element for initiating the oscillation movement. In this manner, it is possible to determine the direction in which an actuating element of the induction generator has been moved. It is thus possible, in a simple manner, to distinguish, for example, between a switching on procedure and a switching off procedure for a device connected to the induction generator, such as a lighting device, for example.

A method for generating an electrical current using an induction generator having a magnet assembly for generating a permanent magnetic field, an annular coil, a spring element and an air channel through which the permanent magnetic field passes, wherein the magnet assembly comprises a first pole section, a second pole section, and a magnet disposed between the first pole section and the second pole section, the coil is connected to the spring element and is movably disposed in the air channel, and wherein the air channel is annular and is designed to accommodate the entire circumference of the annular coil, has the following steps:

deflection of the coil such that an oscillation movement of the coil is caused, transverse to a magnetic flux of the permanent magnetic field inside the air channel; and generation of the electrical current in the coil by means of electromagnetic induction, based on the oscillation movement of the coil.

The concept presented herein can also be advantageously implemented in this form of a method according to embodiments of the invention presented herein.

The invention shall be explained in greater detail, by way of example, based on the attached drawings. Therein:

In the following description of preferred embodiment examples of the present invention, identical or similar reference symbols shall be used for the elements depicted in the various figures having a similar function, wherein there will be no repeated description of these elements.

Figure 1:
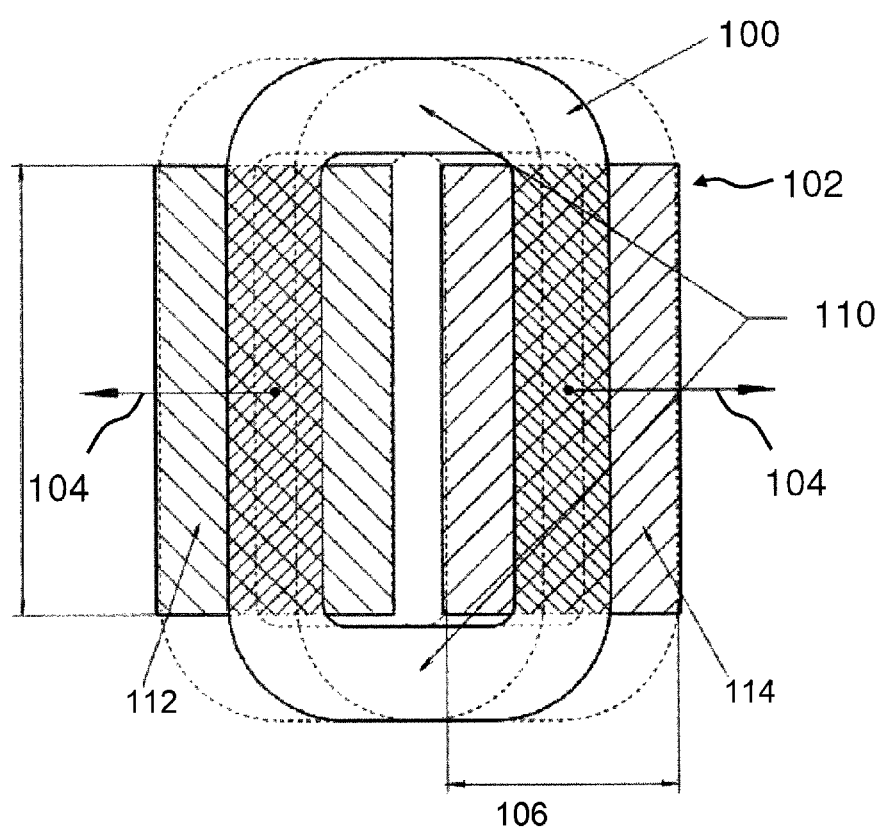
FIG. 1 shows a basic principle for explaining the efficiency in an induction system.

FIG. 1 shows a basic principle for explaining the efficiency in an induction system. Shown therein is a coil, or winding 100, which executes an oscillating relative movement, indicated by an arrow, in a magnetic field 102. Various double arrows indicate an oscillation amplitude 106 of the coil 100, an effectively used winding length 108 of the coil 100, and the loss regions 110 of the winding 100. Because the coil 100 oscillates in operation, in a longitudinal direction indicated by the arrow 104, both legs of the coil 100 must be located in separate sections 112 and 114 of the magnetic field 102, running in opposite directions. Two of the sections of the coil 100 forming the loss regions, shown at the top and bottom of the depiction, fulfill here merely a duty as "connecting pieces" and "partitions." A portion of the energy induced in the winding is lost thereby, due to the resistance losses in a conductor forming the winding 100, e.g. a copper wire.

The basic construction of an induction generator in accordance with embodiment examples of the present invention shall be illustrated based on the following figures. The exemplary induction generators described in the figures can be used, in particular, for operating a self-sufficient remote switch.

Figure 2A:
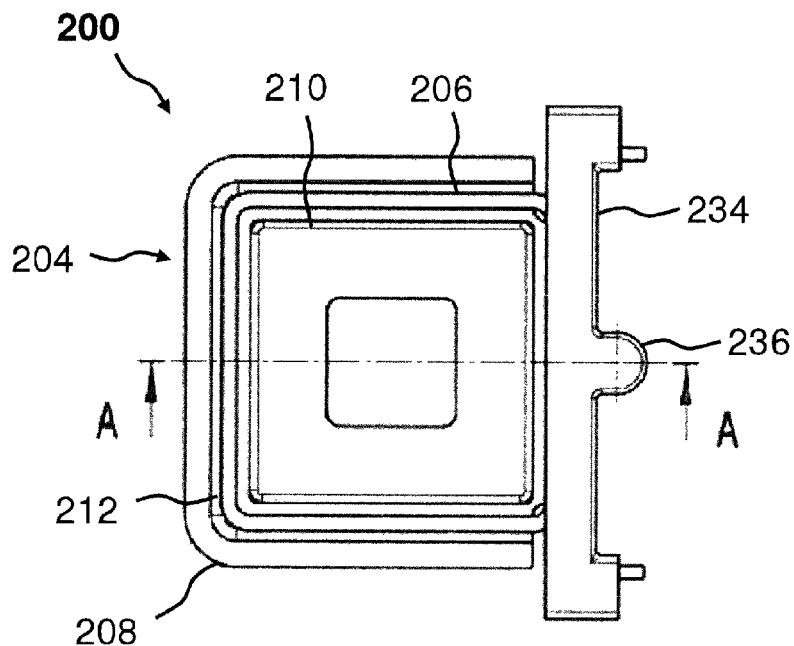
FIG. 2A shows a basic principle of an induction generator in accordance with an embodiment example of the present invention, in a top view.

FIG. 2A shows a basic principle of an induction generator 200 in accordance with an embodiment example of the present invention. The induction generator 200 is depicted in a top view. A coil carrier 234 for housing an annular coil 206 is shown, wherein the coil carrier 234 comprises an actuating element 236 for deflecting the annular coil 206, and a magnet assembly 204, which is functionally connected to the annular coil 206 for inducing a voltage in the coil 206. An air channel 212 runs between a first pole section 208 and a second pole section 210 of the magnet assembly 204, which, like the coil, is annular, and which accommodates the entire circumference of the coil 206. A section of the air channel 212 as well as the coil 206 disposed therein is covered in the drawing in FIG. 2A by the coil carrier 234. As is shown by the depiction, in the embodiment example of the induction generator 200 shown here, both the magnet assembly 204 as well as the coil 206 are rectangular, and nearly square.

Figure 2B:
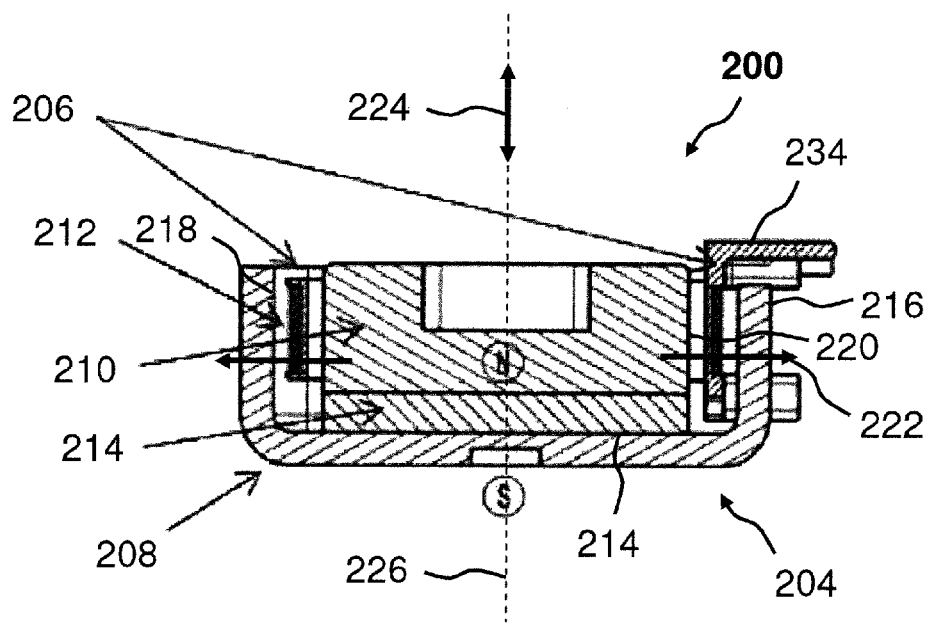
FIG. 2B shows a cross-sectional view of the induction generator from FIG. 2A.

FIG. 2B shows a cross-sectional view of the induction generator 200 from FIG. 2A, cut along a line A-A in FIG. 2A, in accordance with an embodiment example of the present invention. The construction of the induction generator 200 is particularly discernable here. The first pole section 208 and the second pole section 210 are designed here as two differently shaped pole shoes, which are disposed such that they are adjacent to a magnet 214 located between the two shoes. In this case, the first pole shoe 208 forms the south pole, and the second pole shoe 210 forms the north pole of the magnet assembly 204. As is shown in the depiction, an encompassing exterior boundary area 216 of the first pole shoe 208, is bent upward, forming a wall section, such that the first pole shoe 208 forms a pot, in the central region of which the magnet 214 and the second pole shoe 210 are disposed on top of one another in the manner of a stack. The second pole shoe 210 is disk-shaped here, and its dimensions cover the magnet 214 lying below it. The encompassing external boundary area 216 of the first pole shoe 208 and an upper surface of the second pole shoe 210 meet at the same height, or form a common surface on the upper surface of the magnet assembly 204 facing away from the first pole shoe 208. In the embodiment example of the induction generator 200 shown in FIG. 2B, the folded over, encompassing wall section 216 of the first pole section 208 forms an outer wall 218 of the air channel 212. A lateral surface of the second pole shoe 210 forms an inner wall 220 of the air channel 212. Opposing arrows indicate a magnetic flux 22 of a torus-shaped magnetic field circuit, existing between the first pole section 208 and the second pole section 210, of the permanent magnetic field formed by the magnet assembly 204. Corresponding to the polarity of the magnet assembly 204 in the embodiment example of the induction generator 200 shown in FIG. 2B, the magnetic flux 222 crosses the air channel 212 here, from the interior toward the exterior, as indicated by the arrow, at least nearly parallel to a floor section of the first pole shoe 208 and at least nearly parallel to a winding plane of the coil 206, when the coil 206 is in a stationary state. The coil 206 is supported in the air gap, or air channel 212 by means of a spring element, such that it can oscillate, which shall be explained in greater detail in the following figures. The coil 206 executes an oscillating relative movement, or an oscillation movement 224, indicated by a double arrow, along a central axis 226 of the coil 206, indicated by a broken line, after an actuation of the actuating element 236 for the coil 206, in order to generate an electrical current flow in the winding of the coil 206, by making use of the Lorentz forces.

As stated already, the magnet system for the induction generator 200 formed by the magnet assembly 204 has a static structure, and is substantially composed of the magnet 214, placed between the pot-shaped first pole shoe 208 and the disk-shaped second pole shoe 210. The vertical legs of the pot-shaped pole shoe 208, formed by the folded over edge section 216, extend to the upper edge of the disk-shaped second pole shoe 210, such that the air gap, or air channel 212, is formed between the pole shoes 208, 210. The magnetic circuit is closed by the air gap 212, and forms a permanent magnetic field in the air gap 212, which is not subjected to a direction reversal during the operation of the induction generator 200. The air gap 212, or the magnet system, respectively, can be round, rectangular, square, etc. For structural, or economic considerations, the magnet system has a square structure in the example shown in FIGS. 2A and 2B. The structure of the induction generator 200 is not limited to the square shape. The induction generator 200 can assume any shape, depending on the requirements, such as triangular, rectangular, or polygonal, as well as circular or oval, for example.

The light, quadrangular winding, or coil 206, is located in the air gap 212, without an iron core. The electrical conductor or the electrical conductors for the coil 206 encircle the second pole shoe 210. The coil 206 is movably supported, and can execute the relative movement 224 along the air gap 212, in an upward and downward direction. Because the winding 206, with basically its entire length, is located in the magnetic field between the first pole shoe 208 and the second pole shoe 210, the resistance losses in the winding 206, in comparison with the prior art, are reduced to a minimum. By this means, a further increase in the efficiency and a minimizing of the structural space can be obtained.

Figure 2C:
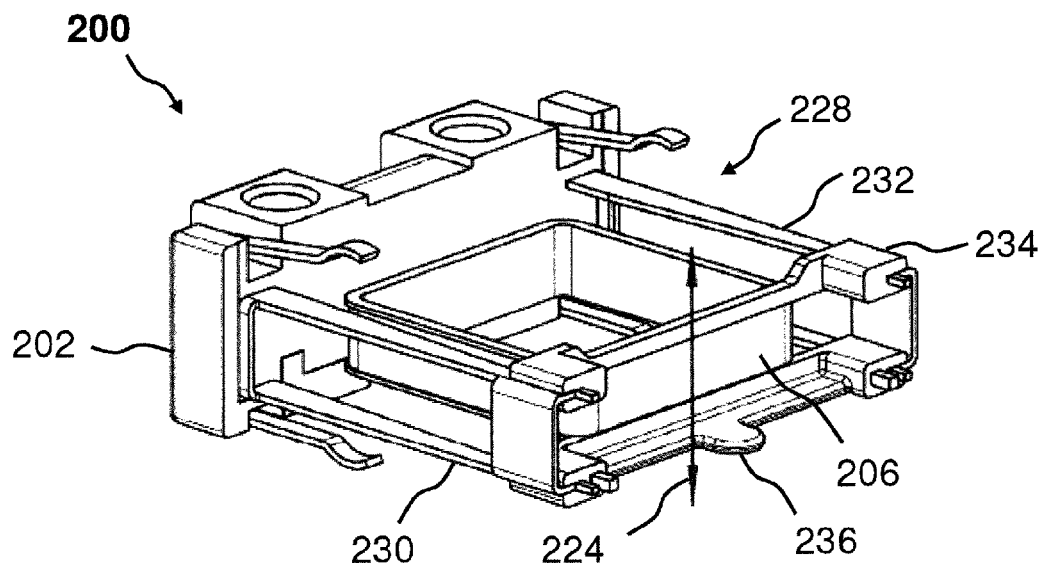
FIG. 2C shows a detailed view of the induction generator from FIGS. 2A and 2B, in a perspective depiction.

FIG. 2C shows a detailed view of the induction generator 200 from FIGS. 1A and 1B in a perspective depiction, in accordance with an embodiment example of the present invention. A spring arm 228, by means of which the coil 206 is movably supported in the air channel 212, can be readily discerned here. With the embodiment example of the induction generator 200 shown here, the spring element 228 is implemented in the form of two "spring parallelograms," which together, basically form a "double parallelogram." As the depiction shows, the double parallelogram is formed by a first double flat spring 230 and a second double flat spring 232 running parallel to the first double flat spring 230, between which the coil 206 is disposed. The first and second double flat springs 230, 232 are each composed of two flat flexible springs, which in turn run parallel to one another. A first end region of the spring element 228 is affixed in the housing, or a supporting structure 202, and another end region of the spring element 228, lying opposite the first end region, is attached to a coil body, or the coil carrier 234, respectively. Because of an assembly of this type, in the form of a parallelogram, the first double flat spring 230 and the second double flat spring 232 can deform in both directions of the oscillation movement 224, while remaining parallel, such that the coil executes the relative movement of the oscillation 224 in a basically parallel movement, and can thus form a very good oscillating body with four flat springs.

According to this embodiment example, the ends of the double flat springs 230, 232 attached to the supporting structure 202 are inserted through the supporting structure 202, and the free end sections of these ends extending beyond the supporting structure 202 are folded over, in a u-shape, and can be used, for example, as electrical contacts, for supplying energy, for example, to a remote module or a different electrical switch, which can be supplied with electrical energy through the operation of the induction generator 200.

The induction generator 200 can be attached to an object, such as a wall, by means of the housing, or the supporting structure 202, respectively. Suitable fasteners, such as screws, can be used for this. During the oscillation 224, the coil 206 moves, while the supporting structure 202, the magnet assembly 204, and the magnetic circuit formed by the magnet assembly remain stationary. If the induction generator 200 is attached to an object, then the coil 206 executes a movement during the oscillation 224, while the supporting structure 202, the magnet assembly 204, as well as the magnetic circuit formed by the magnet assembly and the object, remain stationary.

A substantial advantage of the concept illustrated in FIG. 2C is that mechanical losses result only from the inner friction in the individual springs—which is practically negligible—and the air resistance during the oscillation of the coil 206.

Because the first double flat spring 230 and the second double flat spring 232 are electrically insulated from one another, they can be used simultaneously for current collection purposes, or for an electrical connection to the coil 206. End wires of the coil 206 can be contacted, both directly, or indirectly, by means of supplementary contact pins at the other spring ends. The spring ends of the first end region can be implemented as one-sided or double-sided spring contacts, and they enable the contacting to an arbitrary electronic module in an extremely simply and inexpensive manner.

The depiction in FIG. 2C also shows the actuating element 236 for the induction generator 200 formed on the coil carrier 234. The coil can be deflected by means of the actuating element 236, having a tongue shape here, and, with the support of the spring element 228, can be caused to oscillate in the permanent magnetic field of the induction generator 200, in order to generate electrical current by making use of the Lorentz force.

The support of the coil 206 by means of the double parallelogram 228 is advantageous, but is not absolutely necessary. The coil 206 can also be supported in an oscillating manner by means, for example, of a simple leaf spring or diaphragm. A simple linear support, combined with flexible, tension, or compression, springs is also possible. For current collection, the double flat springs 230, 232, flexible films, sliding contacts, or wires can be used thereby.

Figure 2D:
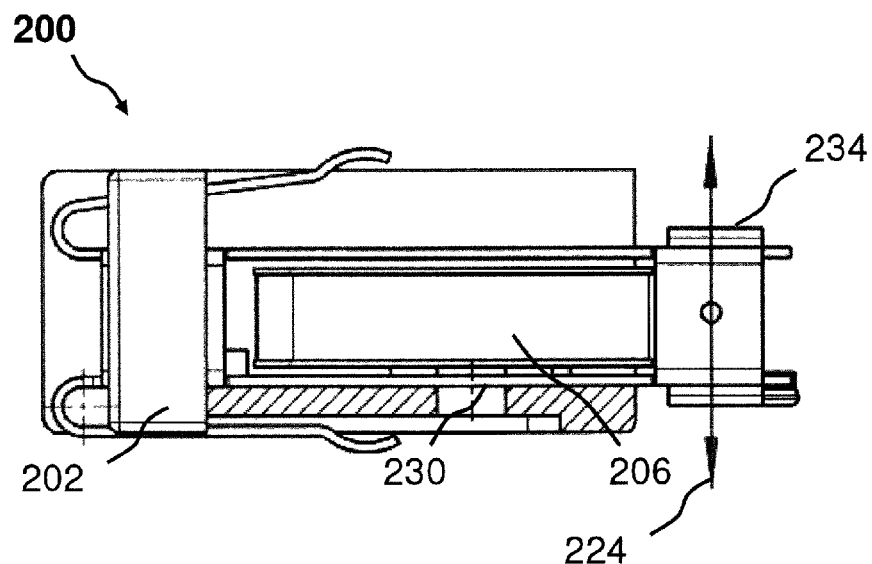
FIG. 2D shows a side view of the induction generator from FIG. 2C.

In FIG. 2D, the construction of the induction generator 200 is shown in a side view, in accordance with an embodiment example of the present invention. Because of the support for the coil 206, the oscillation 224 can be characterized, at least approximately, by linear movements in opposite directions. Alternatively, the oscillation 224 can exhibit a slightly rotating course.

Figure 2E:
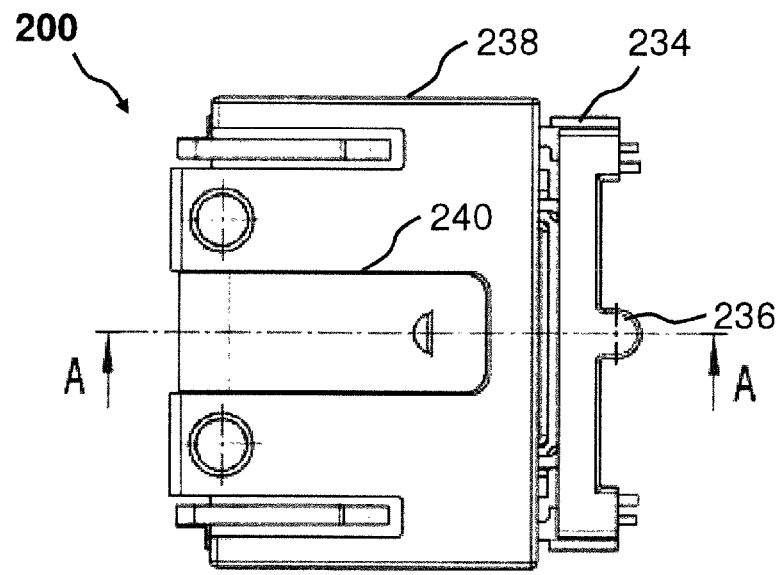
FIG. 2E shows a top view of an induction generator from FIGS. 2C and 2D in a housing.

FIG. 2E shows, based on a top view, the fully assembled induction generator 200 in accordance with an embodiment example of the present invention. The assembly, comprising a magnet system and oscillation system, explained in the preceding Figures, is now placed in a protective housing 238. An attachment clamp 240 is used in order that all of the elements of the induction generator 200 necessary for generating current remain optimally positioned in relation to one another, even when subjected to a load, and a flawless functioning of the induction generator 200 can be ensured.

Figure 2F:
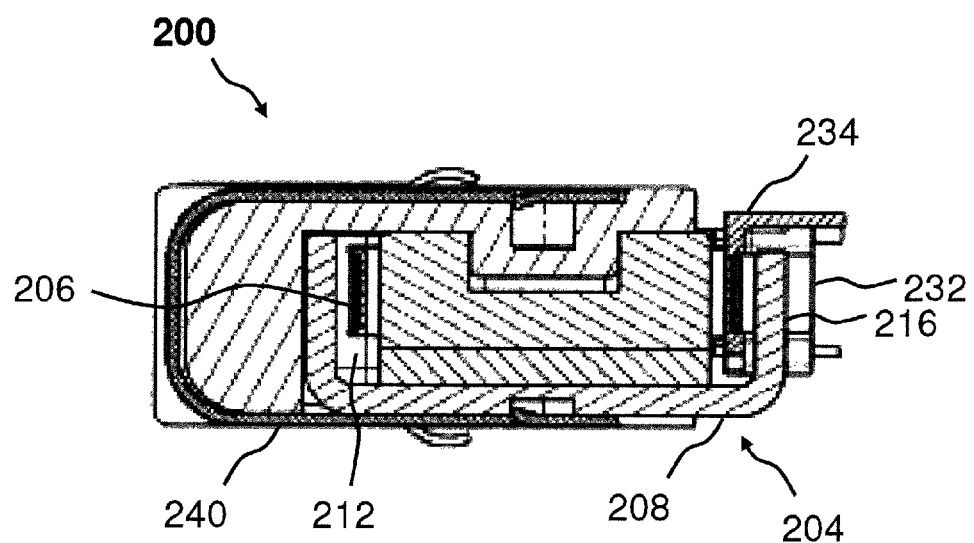
FIG. 2F shows a sectional view of the induction generator from FIG. 2E.

FIG. 2F shows the fully assembled induction generator 200 in a cross-section, cut along a line A-A in FIG. 2E, in accordance with an embodiment example of the present invention. It can be readily seen here that the fastening clamp 240 is suited for supporting the static attachment of the magnet assembly 204, while the coil 206 positioned in the air channel 212 by means of the coil carrier 234 can oscillate freely therein.

As is shown by the depictions in the figures, the induction generator 200 is conceived in a flat, compact construction.

Figure 2G:
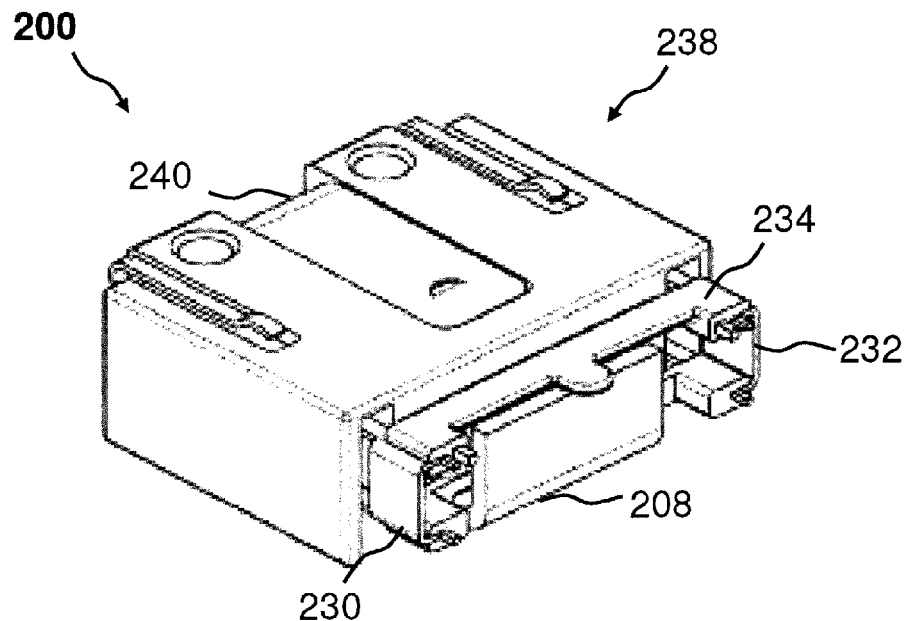
FIG. 2G shows a perspective view from above of the induction generator from FIG. 2E.

FIG. 2G shows the induction generator 200 conceived in this manner, in a perspective top view, in accordance with an embodiment example of the present invention.

Figure 2H:
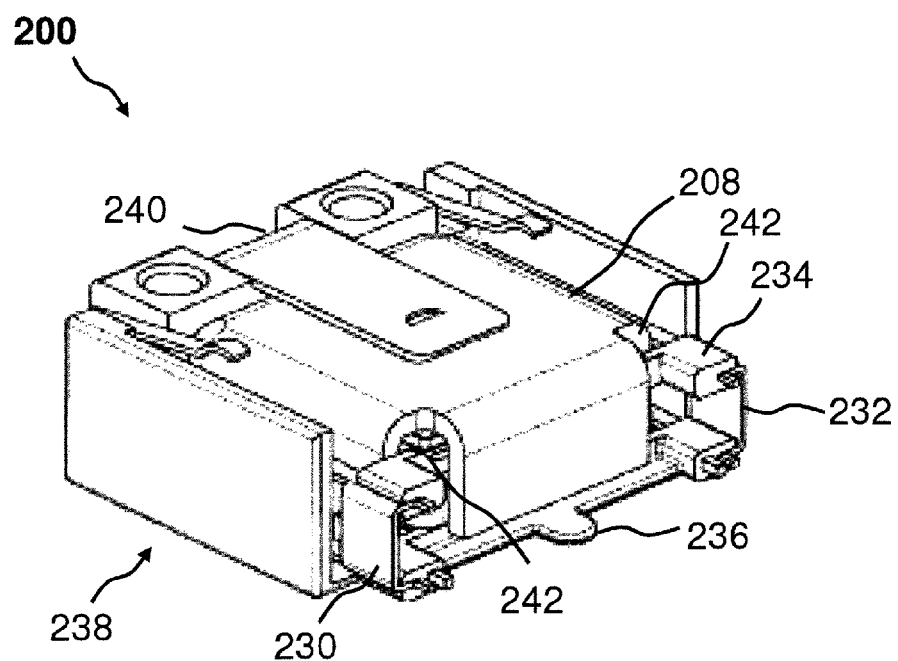
FIG. 2H shows a perspective view from below of the induction generator from FIG. 2E.

FIG. 2H shows the induction generator 200 in a perspective view from below, in accordance with an embodiment example of the present invention. According to this embodiment example, the encompassing outer boundary area 216 of the first pole section 208 does not form an encompassing closed outer wall of the air channel, in which the coil can oscillate. Instead, the outer boundary area 216 of the first pole section 208 has slots 242 at the corners, which extend to the floor of the air channel formed by the first pole section 208 and the second pole section 210. By this means, the outer wall of the air channel is interrupted by slots 242, which are located in the corner regions of the rectangular wound coil 206. Free ends of the coil carrier 234 protrude through the slots 242, wherein the free ends of the coil carrier 234 are connected to the free ends of the first double flat spring 230 and second double flat spring 232. As a result, the coil can be entirely encompassed and protected by the pot-shaped first pole section 208. The support and actuation of the coil 206 occurs via the bearing and actuating elements disposed outside the first pole section 208, individually via the double flat springs 230 232 extending outside the first pole section 208 from the supporting structure 202 to the coil carrier 234, and via the actuating element 236 extending laterally over the first pole section 208.

Figure 2I:
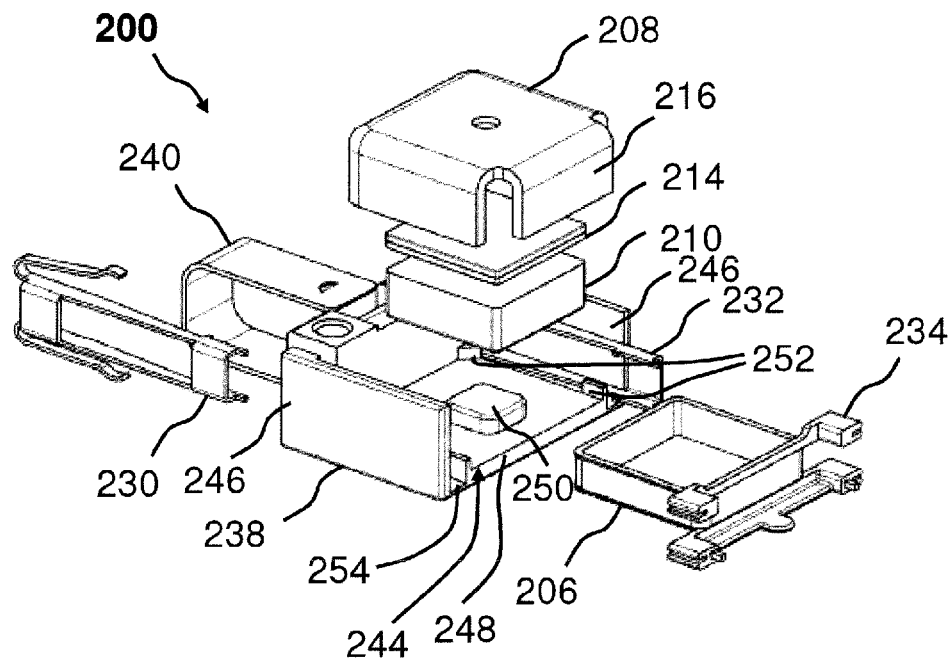
FIG. 2I shows an exploded view of the induction generator from FIG. 2H.

FIG. 2I shows an exploded view of the induction generator 200 in accordance with an embodiment example of the present invention. The depiction shows that the assembly of the induction generator 200 can be executed relatively simply. The individual parts 206, 208, 210, 214, 230, 232, 234 are joined in the housing 238, and fixed therein using attachment clamps 240. Because the magnet 214 is entirely encompassed by the pole shoes 208, 210, it is well protected against strong magnetic fields, as well as mechanical and thermal loads.

The housing 238 forms a rectangular trough, open on two sides, wherein the interior 244 of the trough forms a receiving region for accommodating the magnet assembly 204 and the coil 206. In other words, the receiving region 244 is bordered at the sides by three side walls 246, disposed at right angles to one another, which form an encompassing housing wall, and by a housing floor 248, connecting the side walls 246 to one another. The housing floor 248 comprises, on its surface facing the receiving region 244, a positioning and retaining device 250, 252, for positioning and retaining the magnet assembly 204, in particular for orienting and retaining the second pole section 210 and the first pole section 208 in an assembled state of the induction generator 200. In detail, the positioning and retaining device comprises a projection 240, disposed centrally on the housing floor 248, which engages with a corresponding recess in the second pole section 210. The external dimensions of the projection 250 and the internal dimensions of the recess are coordinated to one another, such that the engagement occurs with as little play as possible, wherein, depending on tolerances, a certain amount of play between these elements can be acceptable. In this preferred embodiment example, the projection 250 is square. The projection 250 can, alternatively, exhibit any other shape suitable for engagement. Furthermore, four other projections 252 are allocated the positioning and retaining device, wherein the additional projections 252 are disposed on the housing floor 248, such that the pot-shaped first pole section 208, when in the assembled state, comes to rest against the inside of the additional projections 252 with its outer surface. This positioning likewise occurs, as with the engagement described above, with as little play as possible. Accordingly, the external dimensions of the first pole shoe 208 and the spacing of the additional projections 252 are adapted to one another. The magnet assembly 204 can be reliably positioned and securely retained against the housing wall 246 by means of the positioning and retaining device.

The central housing wall 246 encompassed by two side walls 246 comprises a passage in each of the corner regions to the adjacent side walls 246, through which the free ends of the first double flat spring 230 and the second double flat spring 232, respectively, are inserted during the assembly. The housing floor 248 has a spring accommodation 254 subjected to play, for accommodating the central region lying between the ends of the double flat springs 230 232. The spring accommodation 254 is formed, in each case, in the extension of the passage, and is bordered laterally by the housing wall 246 as well as by two of the additional projections 252, lying opposite the housing wall 246. The spring accommodation 254 is formed by means of a recess in the housing floor 248, and exhibits internal dimensions allowing for an unimpeded oscillation of the double flat springs 230, 232, or for an unimpeded oscillation of the coil 206, after it has been actuated by means of the actuating element 236. In other words, the double flat springs 230, 232 are disposed such that they can move freely in the respective spring accommodations 254, at least in the direction of oscillation for the coil 206. The bordering housing wall 246 and the two additional projections 252 can form a guide for the double flat springs 230, 232 in the direction of oscillation thereby, in order that a movement of the double flat springs 230, 232 transverse to the direction of oscillation, and thus a movement of the coil in this direction, can be suppressed.

In the following, a functionality of the induction generator 200 shown in FIGS. 2A to 2I shall be explained.

In order to actuate the generator 200, the actuating tongue 236 of the coil carrier 234 is caught by an actuator, deflected in or of the two directions of the relative movement 224 up to a specific point or to a specific force, and abruptly released. The coil 206 begins to oscillate in the constant magnetic field, and electrical energy is induced therein according to the Lorentz force law, which is collected by the two double flat springs 230, 232 for supplying a transmitter module. As a result of the counter induction, an oscillation amplitude of the coil 206 decreases, depending on a load power consumption, until the coil carrier 234 comes to rest. The pulse length can be controlled by a spring constant for the spring element 228, and a weight of the coil 206. Losses only occur here, substantially, as a result of the air resistance during the oscillation. With this concept, achievable efficiencies lie between 75 and 90%. The iron circuit of the magnet system for the energy converter 200 is used only in a portion of the magnet hysteresis, in contrast to conventional systems, and thus does not place any high demands on the magnetic properties, and lowers the system costs significantly. The induction generator 200 generates an alternating current. It is possible to measure the polarity, e.g., the first semi-sinusoidal wave, and to use this to determine the direction. By this means, an "on" and an "off" signal, for example, can be generated and transmitted, depending on the actuation direction of the generator 200, this being without additional encoding contacts.

As has already been stated, and is shown in the following Figures, the magnet system of the energy converter 200 can be constructed in different manners. In particular, the shape of the air channel, and thus the shape of the coil, can be varied.

Figure 3A:
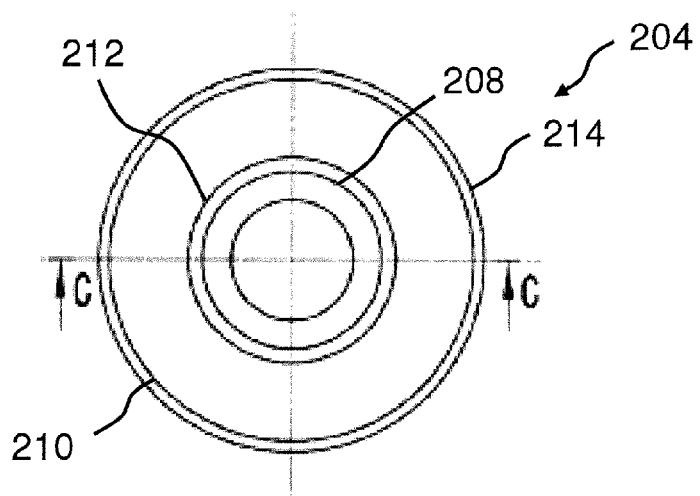
FIG. 3A shows a top view of a magnet system for an induction generator in accordance with another embodiment example of the present invention.

FIG. 3A shows a top view of a magnet system for an induction generator according to another embodiment example of the present invention. The magnet system is formed by a magnet assembly 204. In contrast to the exemplary induction generator described on the basis of FIGS. 2A to 2I, in which a flat cuboid magnet is disposed, in a space saving manner, inside the coil, in this case an annular magnet is used for the magnet in the magnet assembly 204. Here as well, the first pole section 208, the magnet 214 and the second pole section 210 are disposed in the manner of a stack, on top of one another, in order to form the air channel 212 between the first pole section 208 and the second pole section 210. The pole sections 208, 210 are implemented as pole shoes bordering on the magnet. The rest of the elements for the induction generator can be implemented as described above, or adapted to the round construction of the magnet system.

Figure 3B:
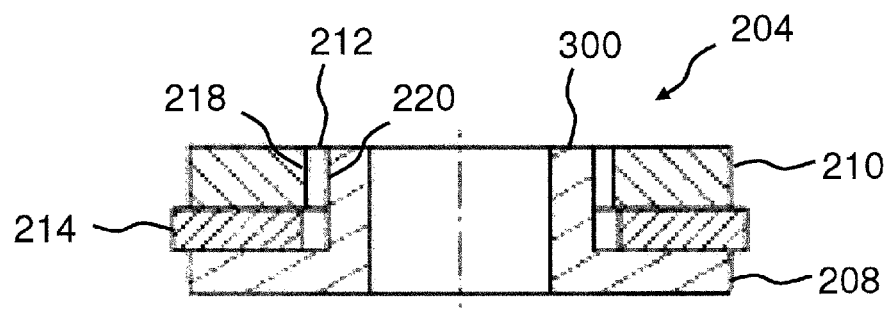
FIG. 3B shows a cross-sectional view of the magnet system from FIG. 3A.

FIG. 3B shows a cross-sectional view of the magnet system shown in FIG. 3A, cut along a line C-C in FIG. 3A in accordance with an embodiment example of the present invention.

As shown by the depiction, the first pole shoe 208 forms a base for the magnet assembly 204 here as well. In differing with the embodiment example described above, a cylindrical central region 300 having an accommodating surface protruding laterally from the central region 300 is provided here, such that the first pole shoe 208 forms a hub-like annular accommodation, onto which the annular magnet 214 and the second pole shoe 210 are attached. The second pole shoe 210 is designed in the shape of a disk, or is annular, and forms a cover for the magnet system. The cylindrical central region 300 of the first pole shoe 208 and the upper surface of the second pole shoe 210 meet at the same height. In other words, the central region 300 exhibits a height corresponding to the material thickness of the magnet 214 and the second pole shoe 210, starting from the laterally protruding accommodating surface. In the embodiment example of the induction generator shown in FIG. 3B, a radial outer surface of the central region 300 of the first pole shoe forms the inner wall 220 of the air channel 212 and the lateral surface, or the radial lateral inner surface of the second pole shoe 210 forms the outer wall 218 of the air channel 212.

Figure 3C:
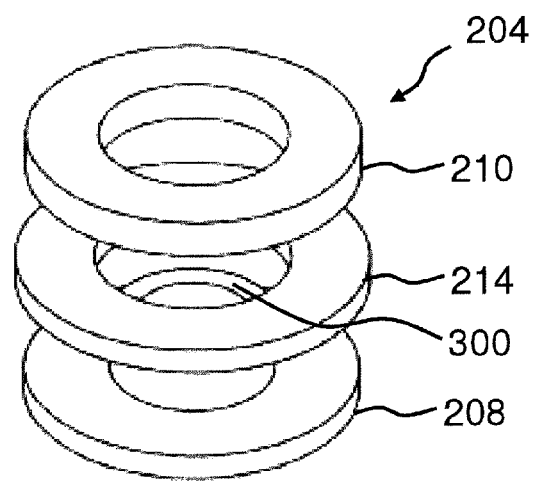
FIG. 3C shows an exploded view of the magnet system from FIGS. 3A and 3B.

FIG. 3C shows an exploded view of the magnet system from FIGS. 3A and 3B in accordance with an embodiment example of the present invention. The annular shape of the magnet 214 and the second pole shoe 210 is depicted here.

The embodiment of the induction generator presented on the basis of FIGS. 3A to 3C is an option when space requirements for the induction generator are not so strongly restricted. In this case, the magnet system for the induction generator can be constructed with the annular magnet described in FIGS. 3A to 3C, in which inexpensive magnets, e.g. ferrite magnets, can be used.

Figure 4:
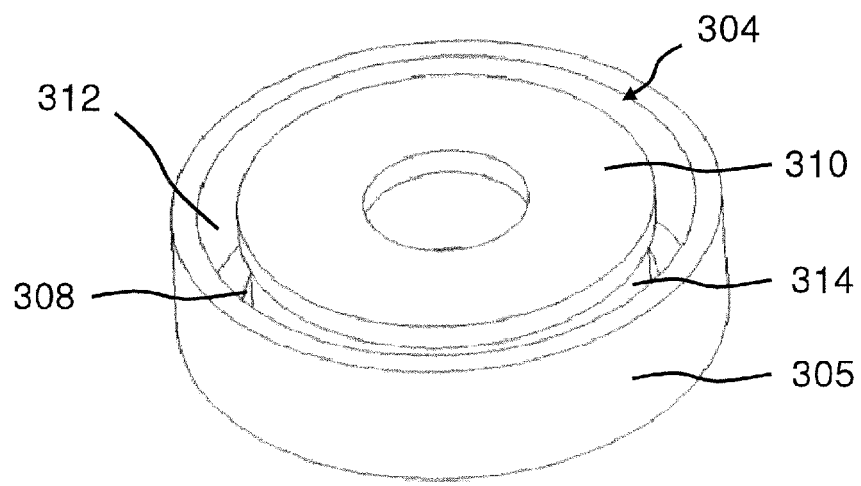
FIG. 4 shows a perspective top view of a magnet system for an induction generator in accordance with another embodiment example.

FIG. 4 shows a perspective top view of a magnet system for an induction generator 301 in accordance with another embodiment example. As with the magnet system shown in FIG. 3A, the magnet system depicted in FIG. 4 is formed by a magnet assembly 304. The magnet assembly 304 has an annular magnet comprising a first pole section 308, a magnet 314 and a second pole section 310, wherein these components are disposed on top of one another, in the manner of a stack. The pole sections 308, 310 are implemented as pole shoes bordering on the magnet 314. In addition, an annular magnetic flux conductor 305 is provided, which encompasses the magnet assembly 304 at a spacing thereto, by means of which the air channel 312 is formed between the magnet assembly 304 and the magnetic flux conductor 305. The magnetic flux conductor 305 is smaller than the magnet assembly 304 in a direction running parallel to the stacked assembly of the magnet assembly 304. The magnetic flux conductor 305 forms an outer wall of the air channel 312 thereby, whereas the magnet assembly 304 forms an inner wall of the air channel 312. This arrangement results in the lowest possible losses in terms of construction space.

As an alternative to the magnet system depicted in FIG. 4, the configuration of the magnet assembly and the magnetic flux conductor can be reversed, wherein the annular magnetic flux conductor is encompassed by an annular magnet assembly having a stacked configuration of pole sections and a magnet. The magnet assembly forms an outer wall of the air channel thereby, while the magnetic flux conductor forms an inner wall of the air channel.

Figure 5:
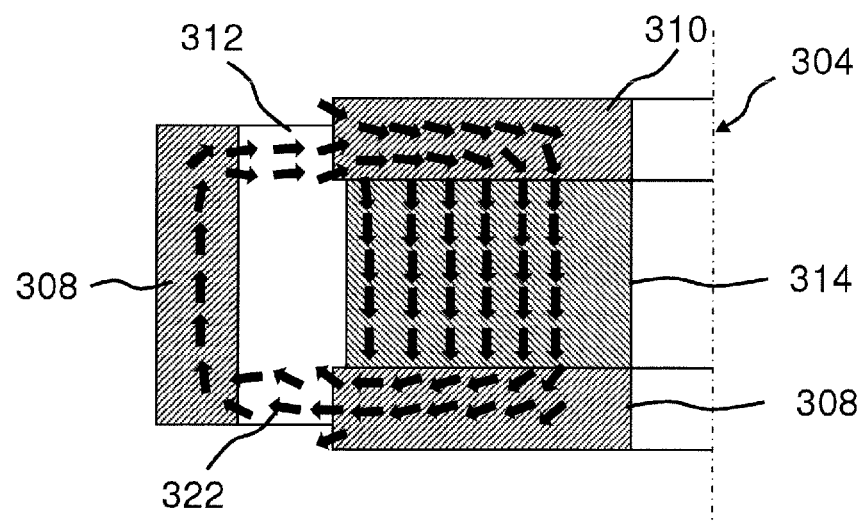
FIG. 5 shows a detail of a cross-sectional view of the magnet system from FIG. 4.

FIG. 5 shows a detail of a cross-sectional view of the magnet system from FIG. 4. The magnetic flux conductor 305 is designed for receiving a magnetic flux 322 of the permanent magnetic field generated by the magnet assembly in an end region, to conduct it to an opposite end region, and to then discharge it toward the magnet assembly 304. The magnetic flux 322 of the permanent magnetic field can thus be conducted between the pole sections 308, 310, wherein a high magnetic flux density is prevalent in the air channel 312 in the regions between the magnetic flux conductor 305 and the respective pole sections 308, 310, and a lower magnetic flux density is prevalent in a region between these regions.

Figure 6:
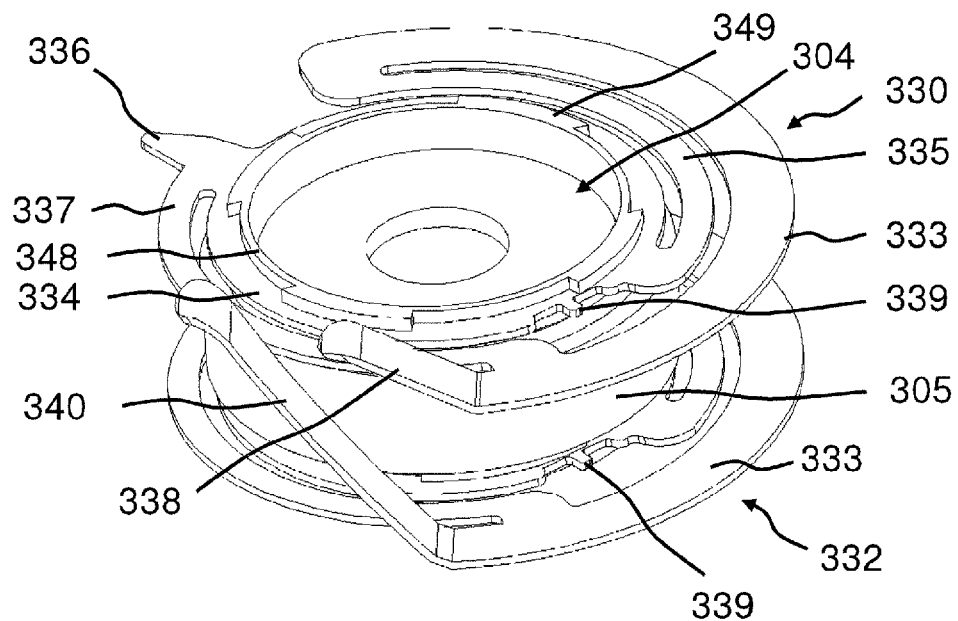
FIG. 6 shows a perspective top view of a coil oscillation system comprising the magnet system from FIG. 4.

FIG. 6 shows a perspective top view of a coil oscillation system encompassing the magnet system from FIG. 4. The coil oscillation system comprises a cylindrical coil carrier 324, on which two annular coil windings, spaced apart from one another, are wound by means of a winding body, such as a coil winding wire, for example (FIG. 9A), wherein the coil windings are electrically connected to one another and form the coil 306. The cylindrical coil carrier 325 has an internal diameter configured for accommodating the magnet assembly 304. The coil carrier 325 can have a two- or multi-part form, designed as an element that can be assembled, in order to enable an attachment of the respective flat flexible springs 330, 332 to the coil carrier 324. For this, the coil carrier 324 has an internal thread on the ends, into which a cylindrical retaining element 348 can be screwed. The cylindrical retaining element 348 has numerous retaining projections 349, disposed around the circumference thereof, which are to rest against a retaining region 334 on a spring element composed of two flat flexible springs 330, 332. The coil carrier 324 likewise has retaining projections 325 on its respective ends, which are to rest against the retaining region 334 (FIG. 8A). The retaining region 334 on the flat flexible springs 330; 332 is clamped between the retaining projections 325, 349 of the coil carrier 324 and the retaining element 348 when in a screwed in state, and is attached by this means to the coil carrier 324.

As an alternative thereto, the coil carrier 324 can have a separating section running in the circumferential direction, in a not shown preferred embodiment example, by means of which the coil carrier 324 can be separated and joined in a direction transverse to its circumferential direction. The separating section is formed by at least two coil carrier edges that can be connected to one another and detached from one another. In this manner, the coil carrier 324 can have a multi-part design, wherein each of the coil carrier parts has one of the coil carrier edges.

As an alternative thereto, the coil carrier 324 can be designed as a single piece, in another, not shown, preferred embodiment example, wherein the separating section runs in a direction transverse to it circumferential direction, in order to be able to separate and join the coil carrier 324 in the circumferential direction. The coil carrier edges are formed thereby by the end edges of the coil carrier 324 present in the circumferential direction. In addition, the coil carrier 324 can be made out of an elastic material, in order to be able to reduce the diameter of the coil carrier 324 after the separation thereof, to the extent that it is possible to slide the respective flat flexible spring 330; 332 onto the coil carrier 324.

Moreover, the single- or multi-piece coil carrier 324 can have fastening elements in the region of the separating section, in order to prevent an inadvertent separation in the region of the separating section. The fastening elements can be formed by engaging means, wherein the engaging means engage with the separating edges that are to be fastened. Furthermore, the engaging means can form locking means for locking the respective separating edges to one another, wherein the engaging means can furthermore exhibit retaining means, such as retaining or locking lugs, or a thread, for the reciprocal retaining of the separating edges in the direction of separation. The coil carrier 324 can be made out of a material containing plastics.

The coil carrier 324 furthermore exhibits a thickness in the radial direction, such that the cylindrical body of the coil carrier 324, with the coil wound around it, can be disposed in the air channel 312, wherein each of the two coil windings of the coil 306 lies opposite one of the pole sections 308, 310.

The spring element 328 that can be attached to the coil carrier 324 has the flat flexible springs 330, 332, which are nearly identically formed from the basic form. Each of the flat flexible springs 330; 332 is formed from a basic form of a leaf spring. The flat flexible springs 330; 332 each comprise a semi-circular supporting edge 333 and a circular retaining region 334 connected thereto, for retaining the coil carrier 324. The retaining region 334 lies on the retaining projections 325 thereby, by means of which a slipping of the flat flexible springs 330; 332 off of the coil carrier 324 is prevented. The supporting edge 33 is connected to the retaining region 334 by means of two circle-segment spring arms 335, 337. The first spring arm 335 extends in a circle segment from a longitudinal end of the supporting edge 33 to a section of the retaining region 334 lying inside the semi-circular supporting edge 333. The second spring arm 337 extends in a circle segment from the other longitudinal end of the supporting edge 333 to a section of the retaining region 334 lying outside the semi-circular supporting edge 333, wherein the outer connection point for the second spring arm 337 lies opposite the inner connection point for the first spring arm 335. As a result, the retaining region 334 is retained with the coil carrier 324, coaxially to the semi-circular supporting edge 333, wherein the retaining region 334 can oscillate freely with the coil carrier 324 in relation to the supporting edge 333, parallel to a longitudinal axis of the coil carrier 324.

The first flat flexible spring 330 has a first contact element 338 in one of the end regions of the supporting edge 333. The contact element 338 extends from a longitudinal end of the supporting edge 333, and protrudes from a plane containing the basic form of the first flat flexible spring 330. The free end of the contact element 338 forms a sliding contact. For this, the free end of the contact element 338 is slightly arched, wherein the arch extending away from the first flat flexible spring 330 forms a sliding contact point, line or surface. The first flat flexible spring 330 can thus be used as an electrical conductor for conducting energy generated by the coil oscillation system. For this, the first flat flexible spring 330 is electrically connected to the coil 306 by means of a connection point 339. The connection point 339 is disposed between the connection point for the first spring arm 335 on the retaining region 334 and the longitudinal end of the supporting edge 333, from which the second spring arm 337 extends, on the retaining region 334.

Moreover, the first flat flexible spring 330 has an actuating element 336 in a region of the connection point for the second spring arm 337 on the retaining region 334, for actuating the coil oscillation system. As a result, it is possible to introduce a force for exciting the coil oscillation system at a location on the flat flexible spring 330 that has a greater material thickness.

The second flat flexible spring 332 has a second contact element 340, which extends from a longitudinal end of the supporting edge 333, and protrudes from a plane containing the basic form of the second flat flexible spring 332. The free end of the second contact element 340 forms a sliding contact by means of an arch, wherein the arch forms a sliding contact point, line or surface. The sliding contact is disposed in a common plane with the sliding contact of the first contact element 338, or is disposed in a plane close to the sliding contact of the first contact element 338. By this means, the respective flat flexible springs 330; 332, designed as electrical conductors, can be brought into electrical contact from one side of the coil oscillation system, in order to be able to tap into the voltage induced by the coil 306. The protruding design of the contact elements 338, 340 enables a pre-loaded contacting of the contact elements 338, 340 with a corresponding counter-contact, by means of a contact applied by pressing the counter-contact onto the contact element 338, 340. As a result, a permanent electrical contact between the contact elements 338, 340 and the respective counter-contact is ensured. The respective counter-contact can be designed, for example, as a sliding path on a printed circuit board.

The second flat flexible spring 332 likewise has a contact point 339 for a winding body, such as a winding wire, for example, for forming the coil 306, wherein the contact point 339 is disposed at the same location as with the first flat flexible spring 330.

Figure 7:
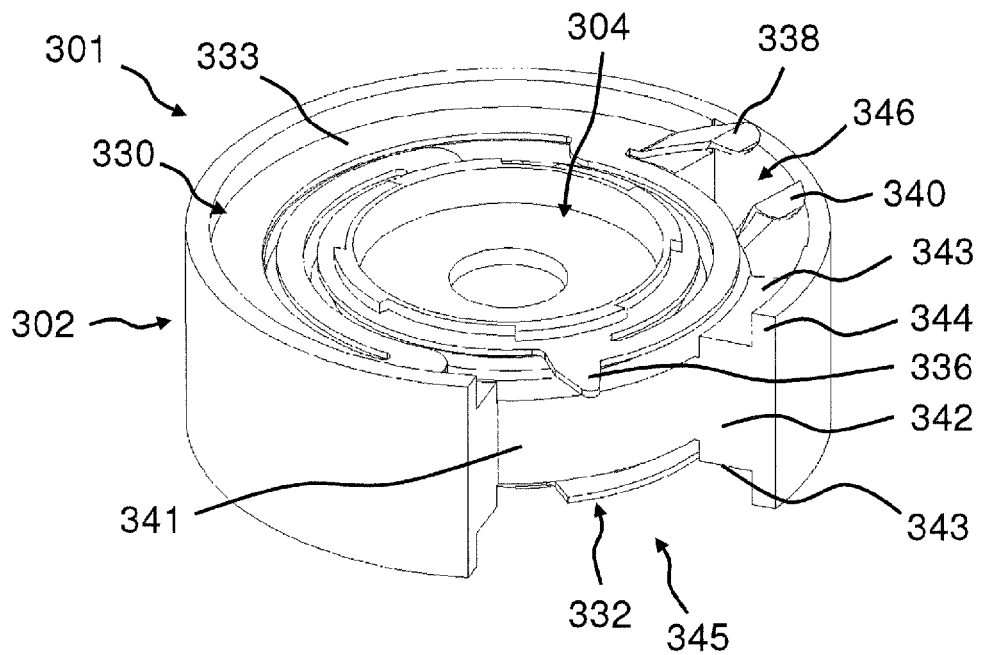
FIG. 7 shows a perspective top view of the induction generator in accordance with another embodiment example.

FIG. 7 shows a perspective top view of the induction generator 301 in accordance with the other embodiment example. The induction generator 301 comprises an annular supporting structure 302, which is formed from a material containing plastics. The supporting structure 302 has an internal diameter for accommodating the magnet assembly 304 and the magnetic flux conductor 305. The supporting structure 302 comprises a first supporting ring 341 for housing the magnetic flux conductor 305, a second supporting ring 342, radially bordering the outside of the first supporting ring 341, having opposing bearing surfaces 343 for the respective support on the supporting edge 333 on the first and second flat flexible spring 330, 332, and a cover ring 344 radially bordering the outside of the second supporting ring 342, for the radial protection of the components accommodated in the supporting structure 302. The second supporting ring 342 is larger than the first supporting ring 341 thereby, along a direction running orthogonal to the radial extension of the supporting structure 302, and is smaller than the cover ring 344. The second supporting ring 342 extends beyond the first supporting ring 341 in this direction on both sides to an equal extent. Furthermore, the cover ring 344 extends beyond the second supporting ring 342 in this direction on both sides to the same extent. The supporting structure 302 is symmetrical in relation to a central plane running radially through a center point of the supporting structure 302.

The magnetic flux conductor 305 is supported by the first supporting ring 341. By way of example, an internal diameter of the first supporting ring 341 can be selected such that the magnetic flux conductor 305 is accommodated in the first supporting ring 341 by means of a press fit. Alternatively, or in addition, retaining means can be used between the magnetic flux conductor 305 and the first supporting ring 341. Adhesive, engaging means, locking means or fastening means or other means suited for retaining can be considered for the retaining means. Alternatively, the first supporting ring 341 can form the magnetic flux conductor 305, in that appropriate magnetic flux conducting materials are integrated in the first supporting ring 341.

The second supporting ring 342 has a gap 345 in a ring segment section, by means of which an outer surface of the first supporting ring 341 is exposed. The gap 345 extends over the cover ring 344 radially bordering the second supporting ring 342 on the outside. The gap 345 forms an actuation region for actuating the coil oscillation system accommodated by the supporting structure 302. The actuating element 336 of the first flat flexible spring 330 extends into the actuation region 345.

The second supporting ring 342 comprises a break 346 in an additional ring segment section, which connects a side of the supporting structure 302 facing a direction running orthogonal to the radial direction to the other side lying opposite thereto. The contact element 340 for the second flat flexible spring 332 extends through the break. As a result, the coil 306 can be electrically contacted on one side of the supporting structure 302 for tapping into the induction voltage generated by the coil 306.

In a ring segment section of the supporting structure 302 lying between the actuating region 345 and the break 346, the bearing surface 343 is disposed such that it can rest against the respective supporting edges 333 of the first and second flat flexible springs 330, 332.

In the state in which the coil oscillation system is accommodated in the supporting structure 302, the border sides of the first supporting ring 341 facing toward the first and second flat flexible springs 330, 332 exhibit a spacing to the first and second flat flexible springs 330, 332, such that the coil can oscillate freely in the supporting structure 302 after it has been excited by actuating the actuating element 336. For this, a size of the first supporting ring 341 running in a direction that is orthogonal to the radial direction of the supporting structure 302 is not larger than a size of the magnetic flux conductor running in the same direction.

Figure 8:
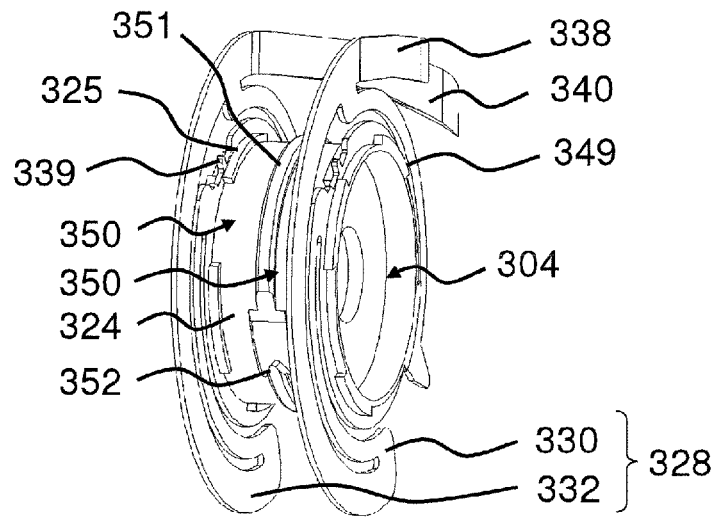
FIG. 8 shows a perspective side view of the coil oscillation system from FIG. 6, without a winding.
Figures 9A, 9B:
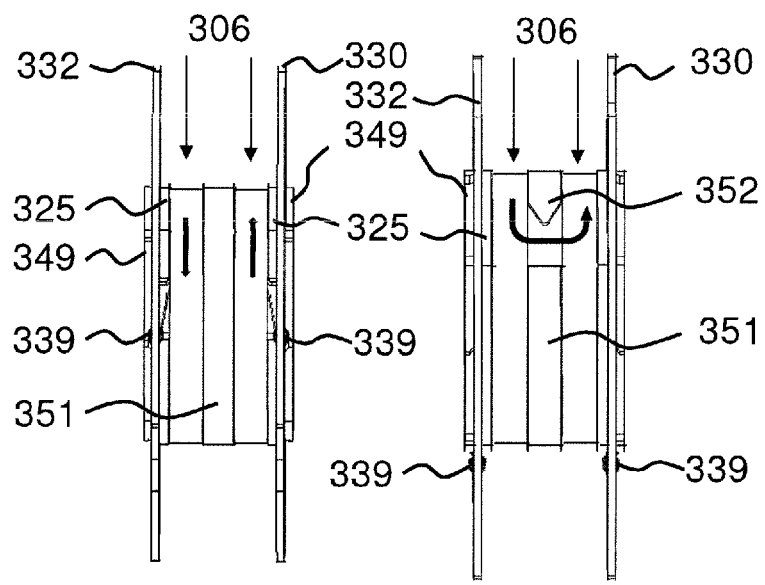
FIG. 9A shows a schematic side view of the coil oscillation system from FIG. 8, with a winding.
FIG. 9B shows another schematic side view of the coil oscillation system.

FIG. 8 shows a perspective side view of the coil oscillation system from FIG. 6, without the coil winding. FIGS. 9A and 9B show a schematic side view of the coil oscillation system, with a coil winding. The coil carrier 324 comprises two circumferential coil channels 350 between the ends thereof, for accommodating in each case a coil winding for forming the coil 306. The two coil channels 350 are separated from one another by a separating strip 351 partially encircling the coil carrier 324, wherein a side edge of the separating strip 351 and a side edge of the retaining projection 325 on the coil carrier 324 border the respective coil channel 341 in the longitudinal direction of the coil carrier 324. The separating strip 351 forms an encompassing flange 352 on its longitudinal ends, by means of which a coil winding can be guided from one of the coil channels 350 into the other coil channel 350, wherein a coil winding direction of the coil windings running in the coil channels 350 runs in opposite directions. As a result, the opposing magnetic flux directions present in the air channel 312, of the magnetic fluxes prevailing in the regions of the first and second pole sections 308, 310, are taken into account, by means of which a coil surface area of the coil 306 is increased.

The constructions selected for the embodiment examples shown in the figures enable a simple encapsulation of the induction generator 200, 301, if, for example, a dust- or water-tight design is desired.

As a matter of course, aside from the constructions shown in the figures, other constructions of the magnet system are possible. It is important that the winding of the coil 206, 306 can oscillate in a magnetic field that is as strong as possible. The movable oscillation system of the induction generator 200, 301 is very compact and light. The coil 206, 306 can only be caused to oscillate in an undesired manner when subjected to very strong external vibrations. In order to prevent the generation of "false" remote signals, the oscillating body, or the coil 206, 306 can be blocked in the stationary and end position by the actuator in a switch housing. Another possibility is to measure the induced voltage, and to only regard a voltage increase above a certain level as a switching signal.

Figure 10:
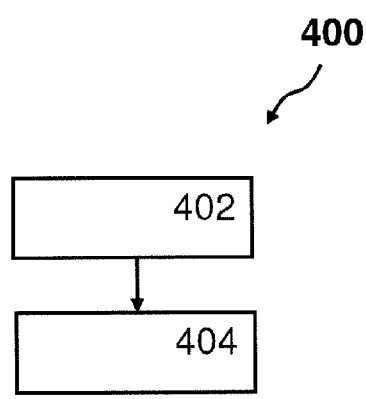
FIG. 10 shows a flow chart for a method for generating an electrical current using an induction generator in accordance with an embodiment example of the present invention.

FIG. 10 shows a flow chart for an embodiment example of a method 400 for generating an electrical current using an induction generator. The method 400 can be advantageously implemented in conjunction with and induction generator, as has been extensively explained above based on FIGS. 2A to 9B. In a step 402, a coil, movably supported by means of a spring element, is deflected to a specific extent, or with a specific force, by means of an actuation of an actuating element in the induction generator. As a result, the coil executes an oscillation movement transverse to a magnetic flux of a permanent magnetic field existing in the induction generator. In step 404, an electrical current is induced in a winding of the coil by means of an electromagnetic induction based on the oscillation movement of the coil. The electrical current is accessed via suitable contacts for operating, for example, a self-sufficient remote switch.

The embodiments described herein and shown in the figures are selected only by way of example. Different embodiment examples can be combined with one another, either entirely, or with respect to individual features. Furthermore, an embodiment example can be supplemented by features of another embodiment example. If an embodiment example comprises an "and/or" conjunction between a first feature and a second feature, this can be read to mean that the embodiment example, in accordance with one embodiment, can exhibit both the first feature as well as the second feature and, in accordance with another embodiment, can exhibit either just the first feature or just the second feature.

REFERENCE SYMBOLS 100 coil
102 magnetic field
104 oscillating relative movement
106 oscillation amplitude
108 effective used winding length
110 loss range
112 magnetic field section
114 other magnetic field section
200, 301 induction generator
202, 302 supporting structure
204, 304 magnet assembly
206, 306 annular coil
208, 308 first pole section
210, 310 second pole section
212, 312 air channel
214, 314 magnet
216 encompassing outer region of the first pole section
218 outer wall of the air channel
220 inner wall of the air channel
222, 322 magnetic flux of the permanent magnetic field
224 oscillation movement
226 central axis of the coil 228, 328 spring element
230 first flat double spring
232 second flat double spring
234, 324 coil carrier
236, 336 actuating element
238 housing
240 fastening clamp
242 slot
244 accommodating region
246 housing wall
248 housing floor
250 projection
252 other projection
254 spring accommodation
300 cylindrical central region of the first pole section
305 magnetic flux conductor
325, 349 retaining projection
330 first flat flexible spring
332 second flat flexible spring
333 supporting edge
334 retaining region
335 first spring arm
337 second spring arm
338 first contact element
339 connection point
340 second contact element
341 first supporting ring
342 second supporting ring
343 bearing surface
344 cover ring
345 actuation region
346 break
348 retaining element
350 coil channel
351 separating strip
352 encompassing flange
400 method for generating an electrical current
402 deflection step
404 generating step

The invention claimed is:

1. An induction generator, comprising:
a magnet assembly configured to generate a permanent magnetic field;
an annular coil;
a spring element; and
an annular air channel through which the permanent magnetic field passes, wherein the annular air channel is configured to accommodate an entire circumference of the annular coil;
wherein the magnet assembly comprises:
a first pole section;
a second pole section; and
a magnet disposed between the first pole section and the second pole section;
wherein the annular coil is connected to the spring element and is movably disposed in the air channel;
wherein in response to a deflection of the annular coil, the spring element is configured to cause the annular coil to oscillate in the air channel transverse to magnetic flux of the permanent magnetic field inside the air channel;
wherein the spring element includes a first double flat spring and a second double flat spring; and between which the coil is moveably supported in the air channel between the first double flat spring and the second double flat spring.

2. The induction generator according to claim 1, wherein the air channel is bordered by at least a first wall region and a second wall region, wherein the second wall region is located opposite to the first wall region,
wherein the first wall region is formed by a wall section of the first pole section and the second wall region is formed by a lateral surface of the second pole section.

3. The induction generator according to claim 2, wherein the first pole section is pot-shaped and is configured to accommodate the magnet and the second pole section, and
wherein the first wall region of the first pole section is formed by an encompassing outer region of the first pole section.

4. The induction generator according to claim 2, wherein the magnet assembly is annular,
wherein the first pole section is a hub-like annular structure configured to accommodate the magnet and the second pole section, and
wherein the second wall region of the first pole section is formed by a cylindrical central region of the first pole section.

5. The induction generator according to claim 1, wherein the permanent magnetic field is configured to form a torus-shaped magnetic field circuit, and
wherein magnetic flux of the magnetic field circuit crosses the air channel between the first pole section and the second pole section.

6. The induction generator according to claim 1, the induction generator further comprising a magnetic flux conductor positioned opposite to the magnet assembly,
wherein the air channel is bordered by a wall section of the magnet assembly and by a wall section of the magnetic flux conductor opposite to the wall section of the magnet assembly.

7. The induction generator according to claim 1, wherein the spring element is further configured to cause the coil to oscillate along a central axis of the coil.

8. The induction generator according to claim 1, wherein a winding of the coil runs along the air channel.

9. The induction generator according to claim 1, the induction generator further comprising a supporting structure configured to house the magnet assembly and the spring element, wherein a first end of the spring element is retained in place by the supporting structure.

10. The induction generator according to claim 9, wherein the coil includes a coil carrier connected to a free end of the spring element, wherein the free end of the spring element is positioned opposite to the first end of the spring element.

11. The induction generator according to claim 10, wherein the coil carrier includes an actuating element configured to deflect the coil.

12. The induction generator according to claim 1, wherein the spring element is an electrical conductor configured to establish an electrical contact to the coil.

13. The induction generator according to claim 1, further comprising a detection device configured to detect an initial polarity of an alternating voltage generated by an oscillation movement of the coil.

14. A method for generating an electrical current using an induction generator, the method comprising:
generating a permanent magnetic field that passes through an air channel, wherein the air channel accommodates an annular coil and the annular coil is connected to a spring element, the spring element including a first double flat spring and a second double flat spring and between which the annular coil is moveably supported in the air channel between the first double flat spring and the second double flat spring;
deflecting the annular coil;

oscillating the annular coil in the air channel transverse to a magnetic flux of the permanent magnetic field inside the air channel; and generating, based on the oscillating annular coil, an electrical current in the annular coil by electromagnetic induction.

15. The method according to claim 14, wherein the magnet assembly comprises:
- a first pole section,
- a second pole section, and
- a magnet disposed between the first pole section and the second pole section,
- wherein the coil is movably disposed in the air channel, and
- wherein the air channel is configured to accommodate the entire circumference of the annular coil.

16. A induction generator comprising:
- a magnet, including a first magnetic pole and a second magnetic pole;
- an inner wall in connection with the first magnetic pole;
- a pot-shaped outer wall co-axially surrounding the inner wall and in connection with the second magnetic pole;
- an annular air gap formed between the inner wall and the outer wall;
- a magnetic field in the annular air gap pointing from the inner wall to the outer wall or pointing from the outer wall to the inner wall; and
- an annular coil located within the annular air gap and connected to a C pair of electrodes, wherein the annular coil is configured to induce a current between the pair of electrodes when the annular coil moves transverse to the magnetic field in the annular air gap; and wherein the pair of electrode comprises a first double flat spring and a second double flat spring: and between which the annular coil is moveably supported in the air gap between the first double flat spring and the second double flat spring.

* * * * *